United States Patent
Kishimoto et al.

(10) Patent No.: US 12,327,001 B2
(45) Date of Patent: *Jun. 10, 2025

(54) DIGITIZER

(71) Applicant: Samsung Display Co., LTD., Yongin-si (KR)

(72) Inventors: Hirotsugu Kishimoto, Gyeonggi-do (KR); Dasom Gu, Asan-si (KR); Chul Ho Jeong, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,944

(22) Filed: Mar. 13, 2024

(65) Prior Publication Data

US 2024/0220062 A1    Jul. 4, 2024

Related U.S. Application Data

(63) Continuation of application No. 17/861,614, filed on Jul. 11, 2022, now Pat. No. 11,954,297.

(30) Foreign Application Priority Data

Oct. 6, 2021   (KR) .......................... 10-2021-0132572

(51) Int. Cl.
*G06F 3/046*     (2006.01)
*G06F 3/041*     (2006.01)

(52) U.S. Cl.
CPC ............ *G06F 3/046* (2013.01); *G06F 3/0412* (2013.01); *G06F 2203/04102* (2013.01); *G06F 2203/04111* (2013.01)

(58) Field of Classification Search
CPC .................. G06F 3/046; G06F 3/0412; G06F 2203/04102; G06F 2203/04111
See application file for complete search history.

(56) References Cited

U.S. PATENT DOCUMENTS

| | | | |
|---|---|---|---|
| 8,923,014 B2 | 12/2014 | Kim et al. | |
| 9,372,509 B2* | 6/2016 | Chang | .................... G06F 3/0448 |
| 11,132,020 B2* | 9/2021 | Kim | ....................... G06F 1/1677 |
| 2015/0241924 A1 | 8/2015 | Chang et al. | |
| 2020/0333836 A1 | 10/2020 | Kim et al. | |

(Continued)

FOREIGN PATENT DOCUMENTS

KR    101481674 B1    1/2015

*Primary Examiner* — Peter D McLoone
(74) *Attorney, Agent, or Firm* — CANTOR COLBURN LLP

(57) ABSTRACT

A digitizer includes a base layer including first and second non-folding areas and a folding area disposed between the first and second non-folding areas and foldable with respect to a folding axis extending in a first direction and a plurality of coils disposed on the base layer and including a first coil and a second coil closest to the first coil. Each of the first coil and the second coil includes a coil portion defining an open loop and a line portion extending from the coil portion. The coil portion or the line portion overlaps the folding area, and a distance between the coil portion of the first coil and the coil portion of the second coil or a distance between the line portion of the first coil and the line portion of the second coil, which overlap the folding area, is equal to or greater than about 100 micrometers.

26 Claims, 16 Drawing Sheets

(56) References Cited

U.S. PATENT DOCUMENTS

| | | |
|---|---|---|
| 2022/0086267 A1 | 3/2022 | Shin et al. |
| 2023/0132000 A1* | 4/2023 | Kishimoto ............ G06F 1/1643 361/679.01 |

* cited by examiner

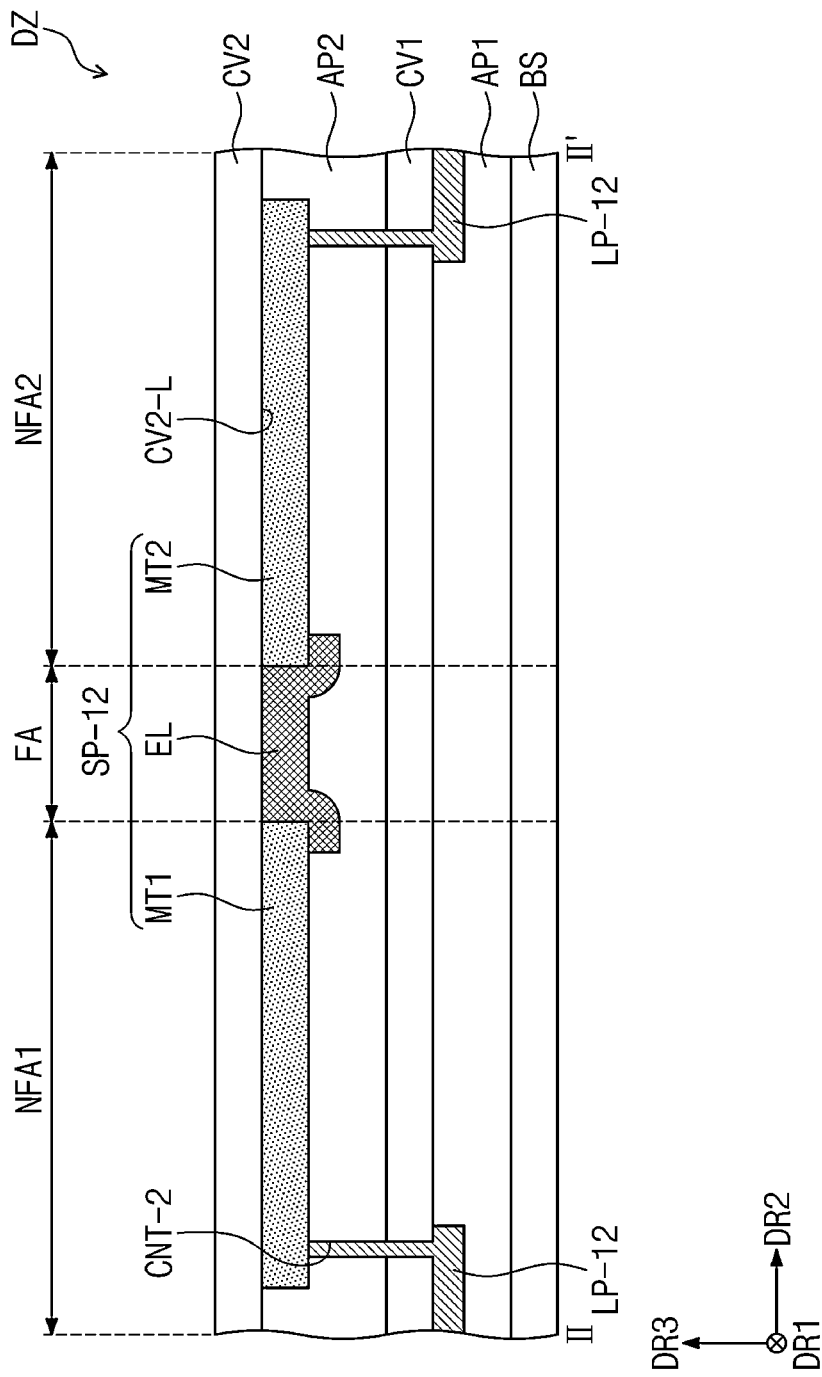

DIGITIZER

This application is a continuation of U.S. patent application Ser. No. 17/861,614, filed on Jul. 11, 2022, which claims priority to Korean Patent Application No. 10-2021-0132572, filed on Oct. 6, 2021, and all the benefits accruing therefrom under 35 U.S.C. § 119, the content of which in its entirety is herein incorporated by reference.

BACKGROUND

1. Field

Embodiments of the invention relate to a digitizer and a display device including the digitizer. More particularly, embodiments of the invention relate to a digitizer with a flexible line and a display device including the digitizer.

2. Description of the Related Art

Electronic items, such as a smart television, a mobile phone, a tablet computer, a computer, a navigation unit, a game unit, etc., are activated in response to electrical signals applied thereto. The electronic items include a sensor to sense inputs applied thereto from the outside of a display panel displaying images. The electronic items include a variety of electrode patterns to be activated in response to the electrical signals. Areas in which the electrode patterns are activated display information or respond to signals applied thereto from the outside.

The electronic items include a display device to provide information. Recently, various types of display devices are being developed with the development of the electronic items. Various flexible display devices that are foldable or rollable, for example, are being developed. Studies are being conducted in various directions to prevent damages to components in a folding portion of the foldable display devices.

SUMMARY

Embodiments of the invention provide a digitizer capable of preventing sensing lines from being damaged in a folding area, improving a process yield, and improving a reliability by reducing a process tolerance.

Embodiments of the invention provide a display device including the digitizer.

An embodiment of the invention provides a digitizer including a base layer including first and second non-folding areas and a folding area disposed between the first and second non-folding areas and foldable with respect to a folding axis extending in a first direction and a plurality of coils disposed on the base layer and including a first coil and a second coil closest to the first coil. Each of the first coil and the second coil includes a coil portion defining an open loop and a line portion extending from the coil portion. The coil portion or the line portion overlaps the folding area, and a distance between the coil portion of the first coil and the coil portion of the second coil or a distance between the line portion of the first coil and the line portion of the second coil, which overlap the folding area, is equal to or greater than about 100 micrometers.

In an embodiment, the coil portion may extend in the first direction, the line portion extends in a second direction crossing the first direction, and the line portion may overlap the folding area.

In an embodiment, the line portion may include a flexible portion overlapping the folding area and a first rigid portion disposed between the flexible portion and the coil portion.

In an embodiment, the line portion may further include a second rigid portion spaced apart from the first rigid portion with the flexible portion interposed therebetween.

In an embodiment, the second rigid portion may include a first extension portion connected to the flexible portion and extending in the second direction, a second extension portion spaced apart from the first extension portion and extending in the second direction, and a bridge extending in the first direction, connecting the first extension portion to the second extension portion, and disposed in a layer different from a layer in which the first extension portion is disposed.

In an embodiment, the coil portion may include at least one long side portion extending in the first direction, and the bridge may have a line width equal to or smaller than a half of a line width of the at least one long side portion.

In an embodiment, the coil portion may include a first long side portion extending in the first direction, a second long side portion spaced apart from the first long side portion in the second direction, a third long side portion spaced apart from the first long side portion in the second direction and spaced apart from the second long side portion in the first direction, a first short side portion connecting one end of the first long side portion to one end of the second long side portion, and a second short side portion connecting an opposite end of the first long side portion opposite to the one end of the first long side portion to one end of the third long side portion.

In an embodiment, the first long side portion may be disposed in a layer different from the first rigid portion and the first short side portion.

In an embodiment, the line portion may include a first line portion and a second line portion, the first line portion may be connected to an opposite end of the second long side portion opposite to the one end of the second long side portion, and the second line portion may be connected to an opposite end of the third long side portion opposite to the one end of the third long side portion.

In an embodiment, a distance between the first line portion and the second line portion may be equal to or greater than about 100 micrometers.

In an embodiment, the plurality of coils may further include a third coil including a coil portion insulated from the coil portion of each of the first and second coils while crossing the coil portion of each of the first and second coils.

In an embodiment, the coil portion may extend in the first direction, the line portion extends in the second direction crossing the first direction, and the coil portion may overlap the folding area.

In an embodiment, the coil portion may include a first long side portion extending in the first direction, a second long side portion spaced apart from the first long side portion in the second direction, a third long side portion spaced apart from the first long side portion in the second direction and spaced apart from the second long side portion in the first direction, a first short side portion connecting one end of the first long side portion to one end of the second long side portion, and a second short side portion connecting an opposite end of the first long side portion opposite to one end of the first long side portion to one end of the third long side portion. The first short side portion may include a flexible portion overlapping the folding area and a rigid portion connected to the flexible portion.

In an embodiment, the flexible portion or the rigid portion may be connected to the one end of the second long side portion.

In an embodiment, the rigid portion may include a first extension portion connected to the flexible portion and extending in the second direction, a second extension portion spaced apart from the first extension portion and extending in the second direction, and a bridge extending in the first direction, connecting the first extension portion to the second extension portion, and disposed in a layer different from a layer in which the first extension portion is disposed.

In an embodiment, the coil portion may extend in the second direction crossing the first direction, and the coil portion may overlap the folding area.

In an embodiment, the coil portion may include a long side portion extending in the second direction, and the long side portion may include a flexible portion overlapping the folding area and a rigid portion disposed between the flexible portion and the line portion.

In an embodiment, the coil portion may include a first long side portion and a second long side portion spaced apart from the first long side portion in the first direction, and a distance between the first long side portion and the second long side portion may be equal to or greater than about 100 micrometers.

In an embodiment, the line portion may include a first extension portion extending in the first direction and disposed in a layer different from a layer in which the coil portion is disposed and a second extension portion extending in the second direction and disposed in a layer different from a layer in which the first extension portion is disposed.

In an embodiment, the digitizer may further include a plurality of insulating layers disposed on the base layer, and at least one of the plurality of insulating layers is provided with an opening defined therethrough in the folding area.

According to the above, the lines extending perpendicular to the folding axis among the lines included in the digitizer have a high flexibility in an area overlapping the folding area, and thus, cracks occurring in the lines, which are caused by a tensile stress applied to the lines when the lines are folded, are prevented.

In addition, as the lines extending perpendicular to the folding axis and overlapping the folding area among the lines included in the digitizer are arranged spaced apart from each other at a predetermined distance, a misalignment occurring between the lines during the printing process of the lines is prevented. Accordingly, the process yield of the digitizer is improved, and thus, a reliability in sensing of an input generated by a pen is improved in the display device.

BRIEF DESCRIPTION OF THE DRAWINGS

The above and other advantages of the invention will become readily apparent by reference to the following detailed description when considered in conjunction with the accompanying drawings, in which:

FIG. 4B is a cross-sectional view of an embodiment of a digitizer taken along line II-II' of FIG. 3 according to the invention;

DETAILED DESCRIPTION

Figure 1A:
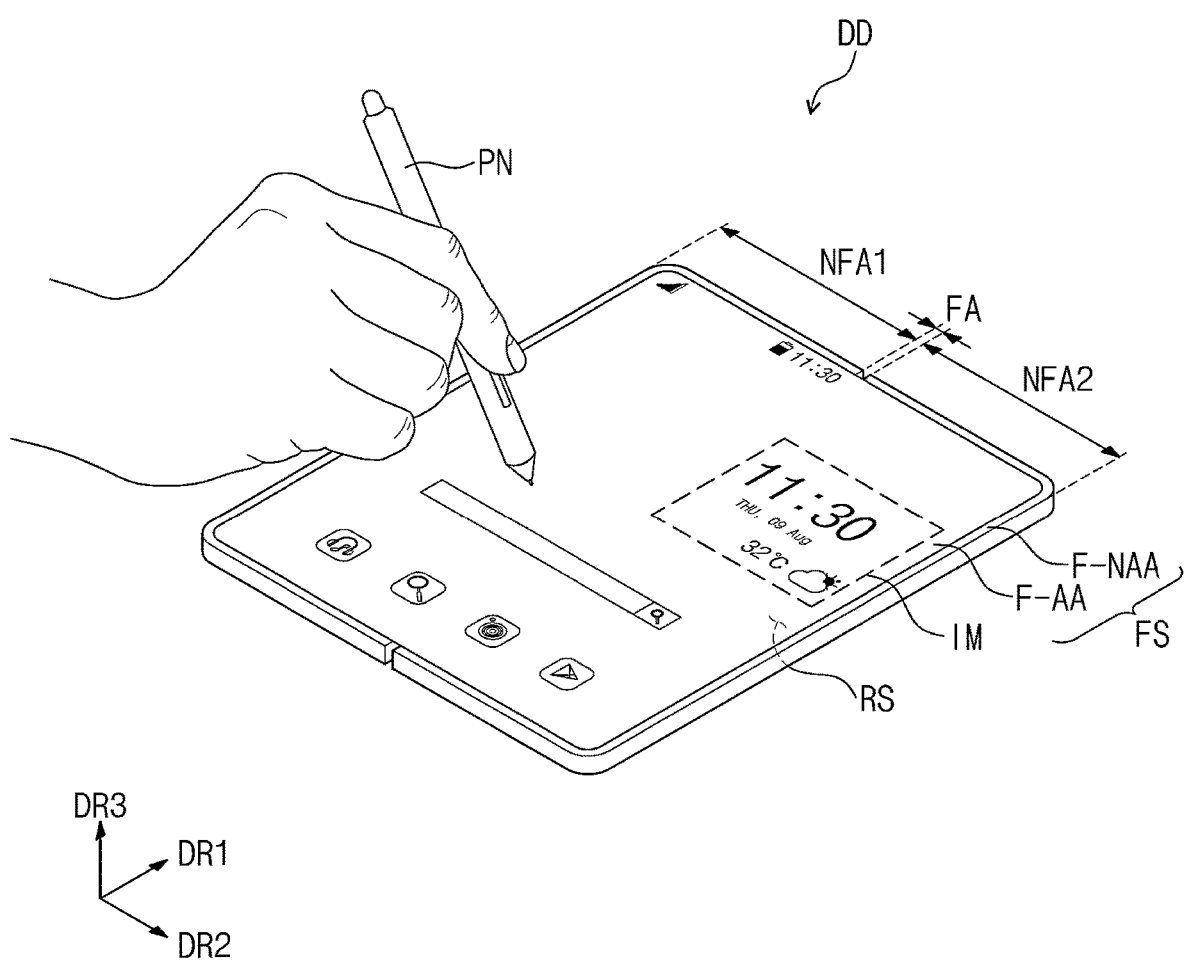
FIG. 1A is a perspective view of an embodiment of a display device in an unfolded state according to the invention.

In the disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" includes any and all combinations of one or more of the associated listed items.

It will be understood that, although the terms first, second, etc., may be used herein to describe various elements, these elements should not be limited by these terms. These terms are only used to distinguish one element from another element. Thus, a first element discussed below could be termed a second element without departing from the teachings of the disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as illustrated in the drawing figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1B:
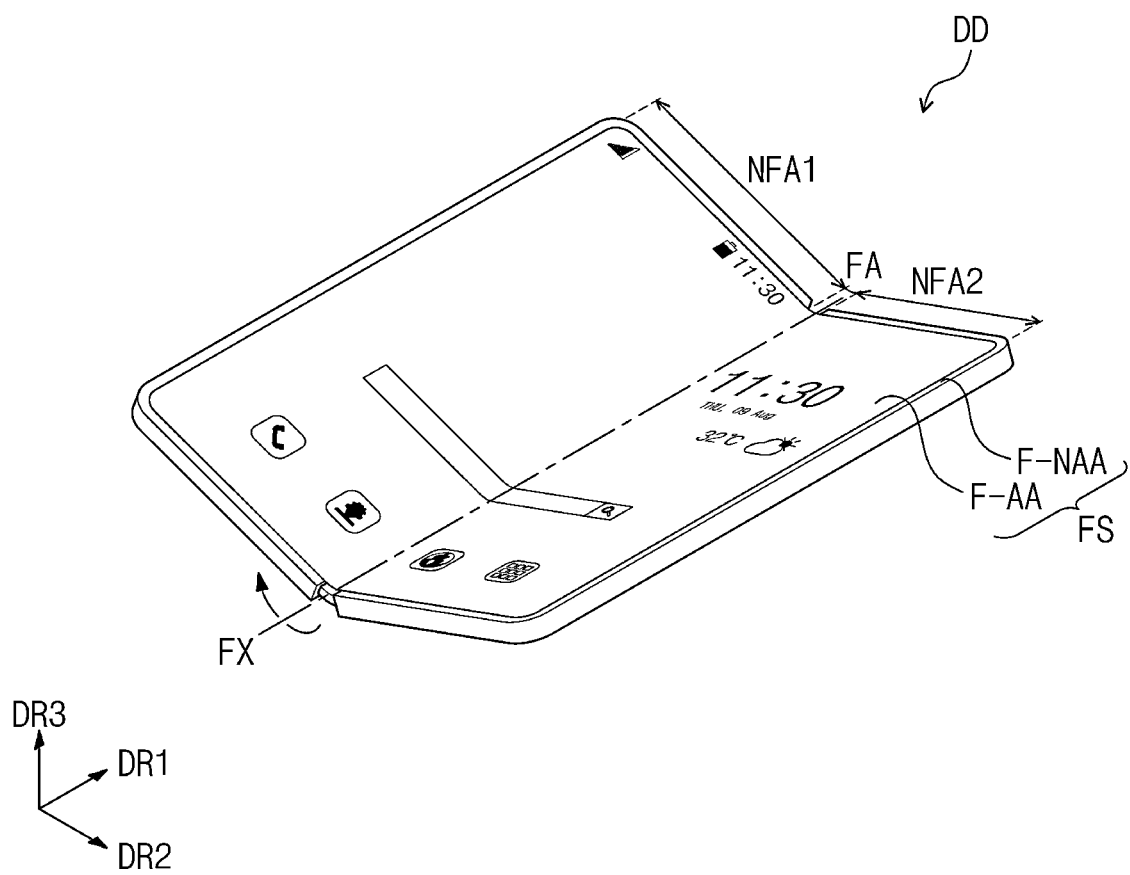
FIG. 1B is a perspective view of an embodiment of a folding operation of a display device according to the invention.
Figure 1C:
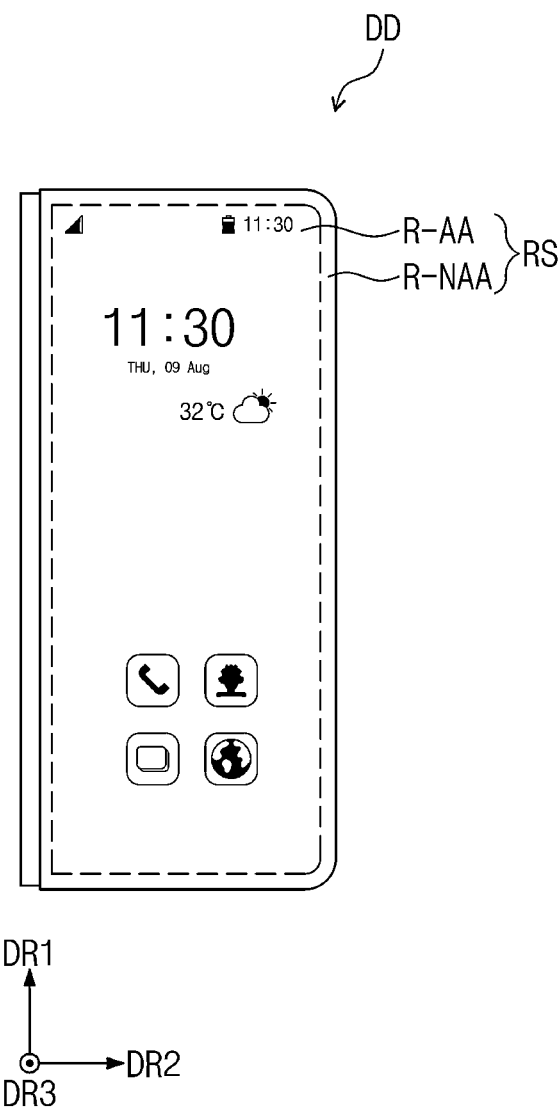
FIG. 1C is a plan view of an embodiment of a display device in a folded state according to the invention.
Figure 1D:
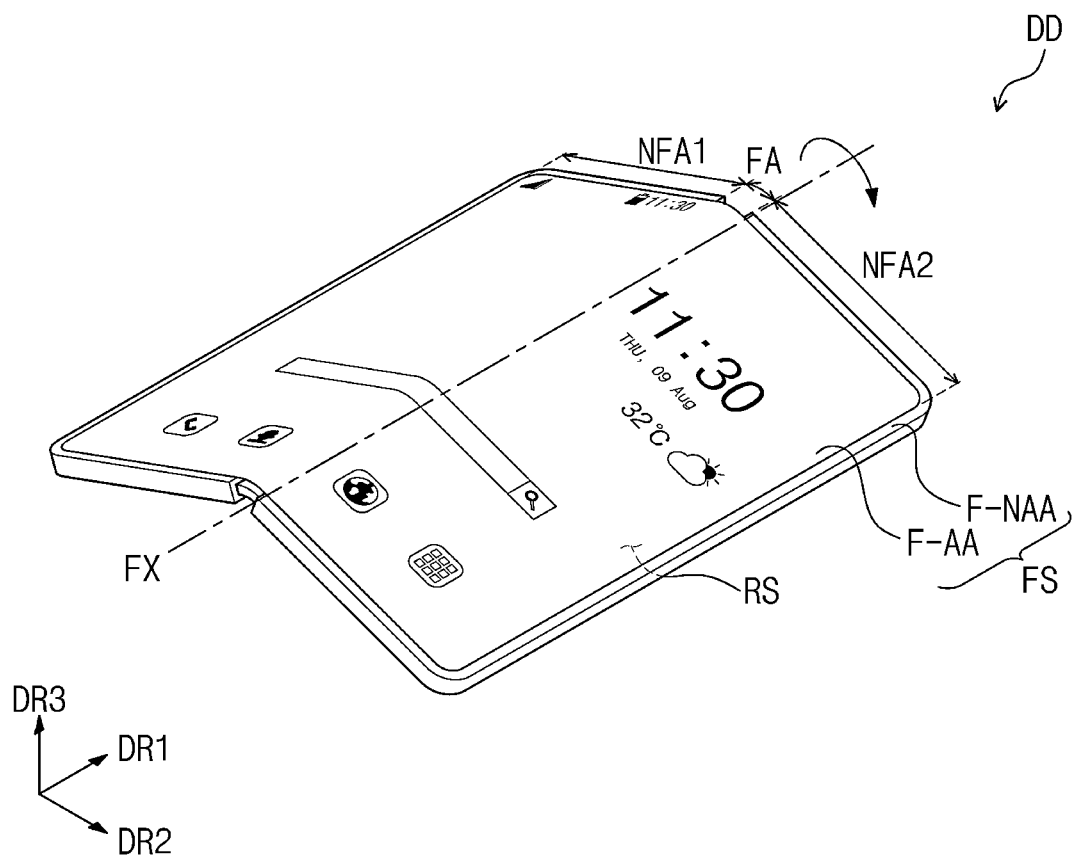
FIG. 1D is a perspective view of an embodiment of a folding operation of a display device according to the invention.

FIG. 1A is a perspective view of an embodiment of a display device DD in an unfolded state according to the invention. FIG. 1B is a perspective view of an embodiment of a folding operation of the display device DD according to the invention. FIG. 1C is a plan view of an embodiment of the display device DD in a folded state according to the invention. FIG. 1D is a perspective view of an embodiment of a folding operation of the display device DD according to the invention.

Referring to FIG. 1A, the display device DD may be a device activated in response to electrical signals. The display device DD may include various embodiments. In the illustrated embodiment, a smartphone will be described as the display device DD. However, the display device DD may include various embodiments. In an embodiment, the display device DD may include a tablet computer, a notebook computer, a computer, or a smart television, for example.

The display device DD may display an image IM through a first display surface FS that is substantially parallel to each of a first direction DR1 and a second direction DR2 toward a third direction DR3 crossing a plane defined by the first direction DR1 and the second direction DR2. The first display surface FS through which the image IM is displayed may correspond to a front surface of the display device DD. The image IM may include a video and a still image. FIG. 1A shows an internet search box and a clock widget in an embodiment of the image IM.

In the illustrated embodiment, front (or upper) and rear (or lower) surfaces of each member of the display device DD may be defined with respect to a direction in which the image IM is displayed. The front and rear surfaces may be opposite to each other in the third direction DR3, and a normal line direction of each of the front and rear surfaces may be substantially parallel to the third direction DR3.

A separation distance between the front surface and the rear surface in the third direction DR3 may correspond to a thickness or a height of the display device DD in the third direction DR3. Directions indicated by the first, second, and third directions DR1, DR2, and DR3 may be relative to each other and may be changed to other directions.

The display device DD may sense an external input applied thereto from an outside. The external input may include various forms of inputs provided from the outside of the display device DD. In an embodiment, the external inputs may include a proximity input (e.g., a hovering input) applied when approaching close to or adjacent to the display device DD at a predetermined distance as well as a touch input by a user's body part (e.g., a user's hand), for example. In addition, the external inputs may be provided in the form of force, pressure, temperature, light, etc.

FIG. 1A shows an embodiment of the external inputs applied by a pen PN of a user. The display device DD may sense the external inputs by an electromagnetic resonance ("EMR") produced between a magnetic field generated in the display device DD and the pen PN. Although not shown in drawing figures, the pen PN may be attached to or detached from an inner or outer portion of the display device DD, and the display device DD may provide or receive signals corresponding to the attachment and detachment of the pen PN.

In an embodiment, the display device DD may include the first display surface FS. The first display surface FS may include a first active area F-AA and a first peripheral area F-NAA. The first active area F-AA may be activated in response to the electrical signals. The image IM may be displayed through the first active area F-AA, and various external inputs may be sensed through the first active area F-AA. The first peripheral area F-NAA may be defined adjacent to the first active area F-AA. The first peripheral area F-NAA may have a predetermined color. The first peripheral area F-NAA may surround the first active area F-AA. Accordingly, the first active area F-AA may have a shape substantially defined by the first peripheral area F-NAA, however, this is merely one of embodiments. In other embodiments, the first peripheral area F-NAA may be defined adjacent to only one side of the first active area F-AA or may be omitted.

In an embodiment, the display device DD may include at least one folding area FA and a plurality of non-folding areas NFA1 and NFA2 extending from the folding area FA. The non-folding areas NFA1 and NFA2 may include a first non-folding area NFA1 and a second non-folding area NFA2 that are arranged in the second direction DR2 with the folding area FA interposed therebetween.

Referring to FIG. 1B, the display device DD may be folded with respect to a folding axis FX that is imaginary and extends in the first direction DR1. The display device DD may be folded about the folding axis FX to be in an in-folding state where the first non-folding area NFA1 of the first display surface FS faces the second non-folding area NFA2 of the first display surface FS.

Referring to FIG. 1C, a second display surface RS of the display device DD may be viewed by a user during the in-folding state of the display device DD. In this case, the second display surface RS may include a second active area R-AA through which the image is displayed. The second active area R-AA may be activated in response to the electrical signals. The second active area R-AA may be an area through which the image is displayed and various external inputs are sensed.

A second peripheral area R-NAA may be defined adjacent to the second active area R-AA. The second peripheral area R-NAA may have a predetermined color. The second peripheral area R-NAA may surround the second active area R-AA. In addition, although not shown in drawing figures, the second display surface RS may further include an electronic module area in which an electronic module including various components is disposed, and the second display surface RS should not be particularly limited.

Referring to FIG. 1D, the display device DD may be folded with respect to the folding axis FX to be in an out-folding state where the first non-folding area NFA1 of the second display surface RS faces the second non-folding area NFA2 of the second display surface RS.

However, the display device DD should not be limited thereto or thereby. The display device DD may be folded with respect to a plurality of folding axes such that a portion of the first display surface FS faces a portion of the second display surface RS, and the number of the folding axes and the number of non-folding areas should not be particularly limited.

Figure 2A:
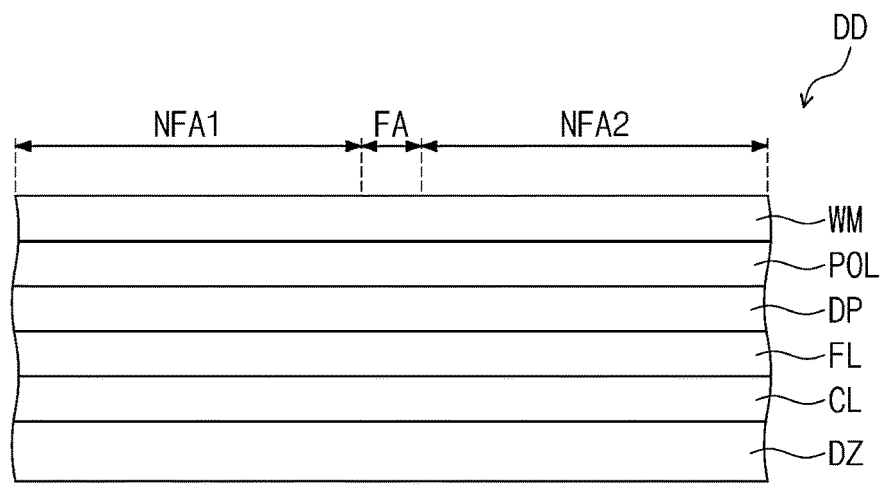
FIG. 2A is a cross-sectional view of an embodiment of a display device according to the invention.
Figure 2A:
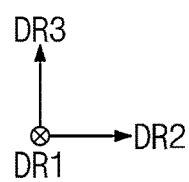
Figure 2B:
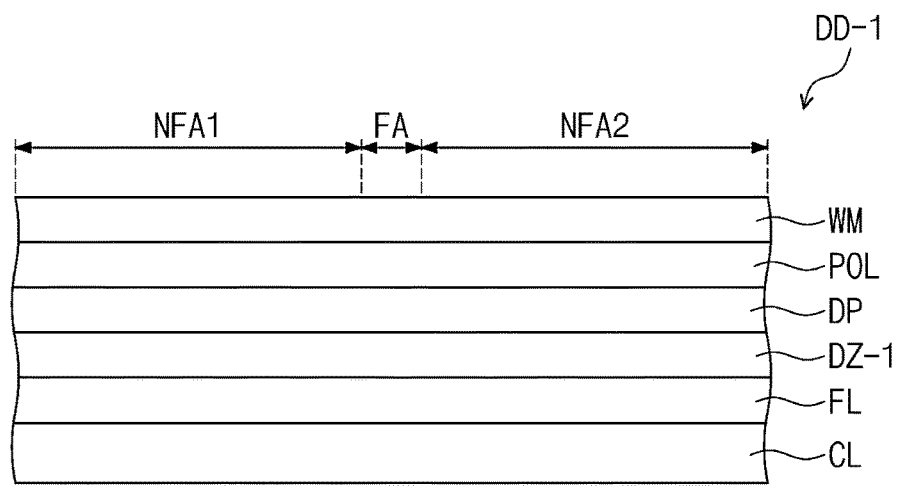
FIG. 2B is a cross-sectional view of an embodiment of a display device according to the invention.
Figure 2B:
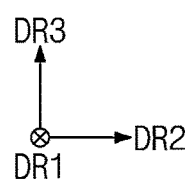

FIG. 2A is a cross-sectional view of an embodiment of the display device DD in an embodiment of the invention, and FIG. 2B is a cross-sectional view of an embodiment of a display device DD-1 according to the invention.

Referring to FIG. 2A, the display device DD may include a window WM, an optical member POL, a display panel DP, a lower film FL, a protective layer CL, and a digitizer DZ.

The window WM may be disposed on the display panel DP. The window WM may be coupled to a housing (not shown) to define an exterior of the display device DD and may protect the display panel DP.

The window WM may include a material having a high light transmittance. In an embodiment, the window WM may include a glass substrate, a sapphire substrate, or a plastic film. The window WM may have a single-layer or multi-layer structure, for example. In an embodiment, the window WM may have a stack structure of a plurality of plastic films attached to each other by an adhesive or a stack structure of the glass substrate and the plastic film attached to the glass substrate by an adhesive, for example. Although not shown in drawing figures, functional layers may be further disposed on the window WM to protect the window WM. In an embodiment, the functional layers may include at least one of an anti-fingerprint layer and an impact absorbing layer, for example.

The optical member POL may be disposed under the window WM. The optical member POL may reduce a reflectance of the display panel DP with respect to the light incident to the display panel DP. Although not shown in drawing figures, the optical member POL may include at least one of an anti-reflective film, a polarizing film, a color filter, and a gray filter.

The display panel DP may be disposed under the optical member POL. The display panel DP may serve as an output device. In an embodiment, the display panel DP may display the image through the first and second active areas F-AA and R-AA (refer to FIGS. 1A and 1C), and the user may acquire information through the image, for example. In addition, the display panel DP may serve as an input device to sense the external input applied to the first and second active areas F-AA and R-AA (refer to FIGS. 1A and 1C).

The lower film FL may be disposed under the display panel DP. The lower film FL may reduce a stress applied to the display panel DP when the display device DD is folded. In addition, the lower film FL may prevent external moisture from entering the display panel DP and may absorb external impacts.

The lower film FL may include a functional layer formed or disposed on a plastic film. The functional layer may include a resin layer. The functional layer may be formed or provided by a coating method.

The protective layer CL may be disposed under the lower film FL. The protective layer CL may include at least one functional layer that protects the display panel DP. In an embodiment, the protective layer CL may include a light shielding layer, a heat dissipating layer, a cushion layer, and a plurality of adhesive layers, for example, however, it should not be limited thereto or thereby. That is, at least one of the light shielding layer, the heat dissipating layer, and the cushion layer may be omitted, and a plurality of layers may be provided as a single layer.

Although not shown in drawing figures, the components included in the display device DD may be coupled to each other by adhesive layers disposed between the components. Hereinafter, the adhesive layers described in the invention may be an optically clear adhesive ("OCA") film, an optically clear resin ("OCR"), or a pressure sensitive adhesive ("PSA") film. In addition, the adhesive layers may include a light-curable adhesive material or a heat-curable adhesive material, and it should not be particularly limited.

The digitizer DZ may be disposed under the protective layer CL. The digitizer DZ may sense the signal transmitted by the pen PN (refer to FIG. 1A) among the external inputs. The digitizer DZ may sense the external inputs by an electromagnetic resonance ("EMR") method. According to the EMR method, a resonant circuit provided in the pen PN generates a magnetic field, the vibrating magnetic field induces signals to a plurality of lines included in the digitizer DZ, and a position of the pen PN is detected based on the signals induced to the lines. The digitizer DZ will be described in detail later.

Referring to FIG. 2B, different from the digitizer DZ shown in FIG. 2A, a digitizer DZ-1 may be disposed between a display panel DP and a lower film FL. The display devices DD and DD-1 shown in FIGS. 2A and 2B are merely some of embodiments, and the position of the digitizer DZ or DZ-1 should not be particularly limited. In an embodiment, the digitizer DZ or DZ-1 may be disposed between the protective layer CL and the lower film FL.

Figure 3:
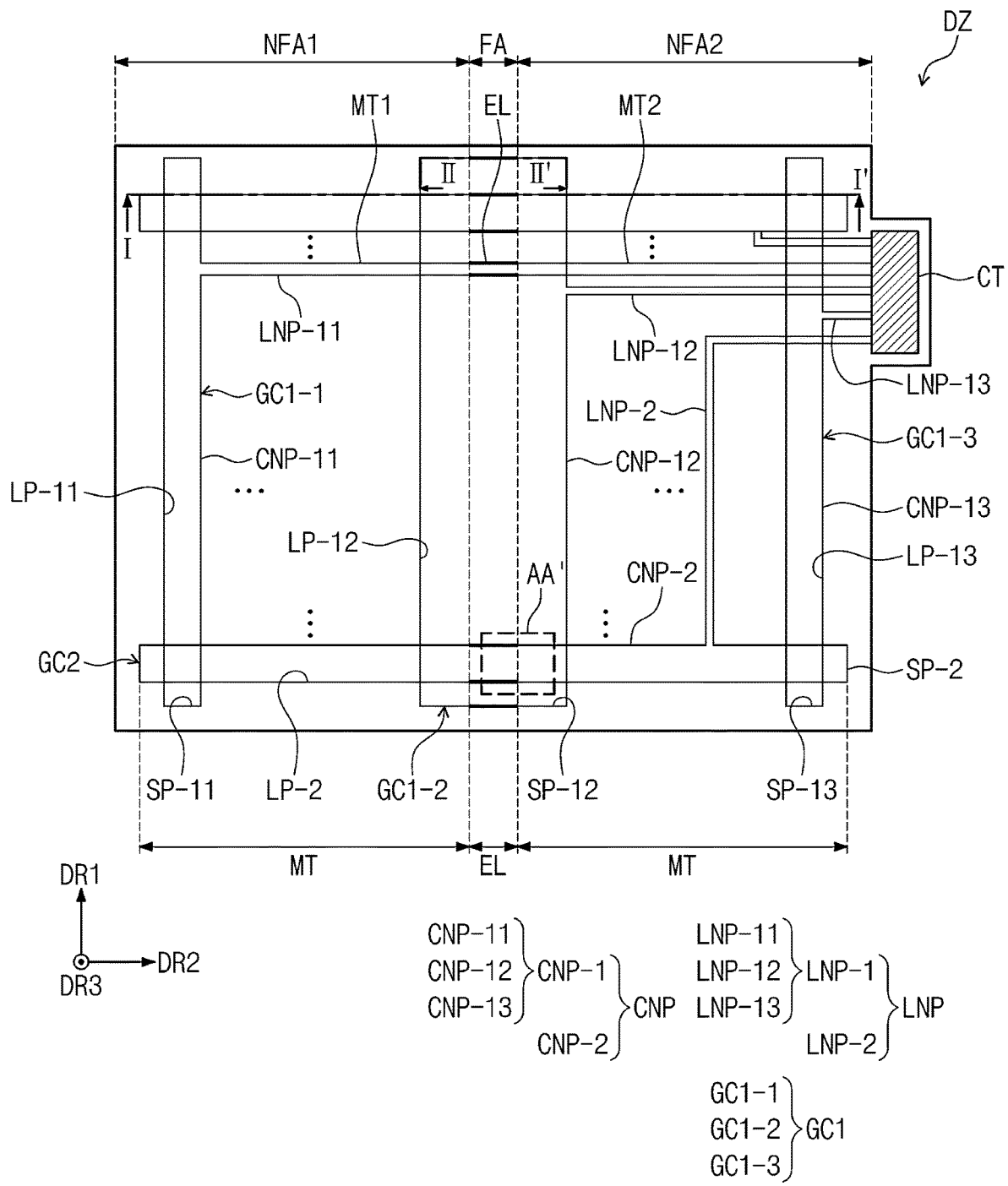
FIG. 3 is a plan view of a digitizer according to the invention.
Figure 4A:
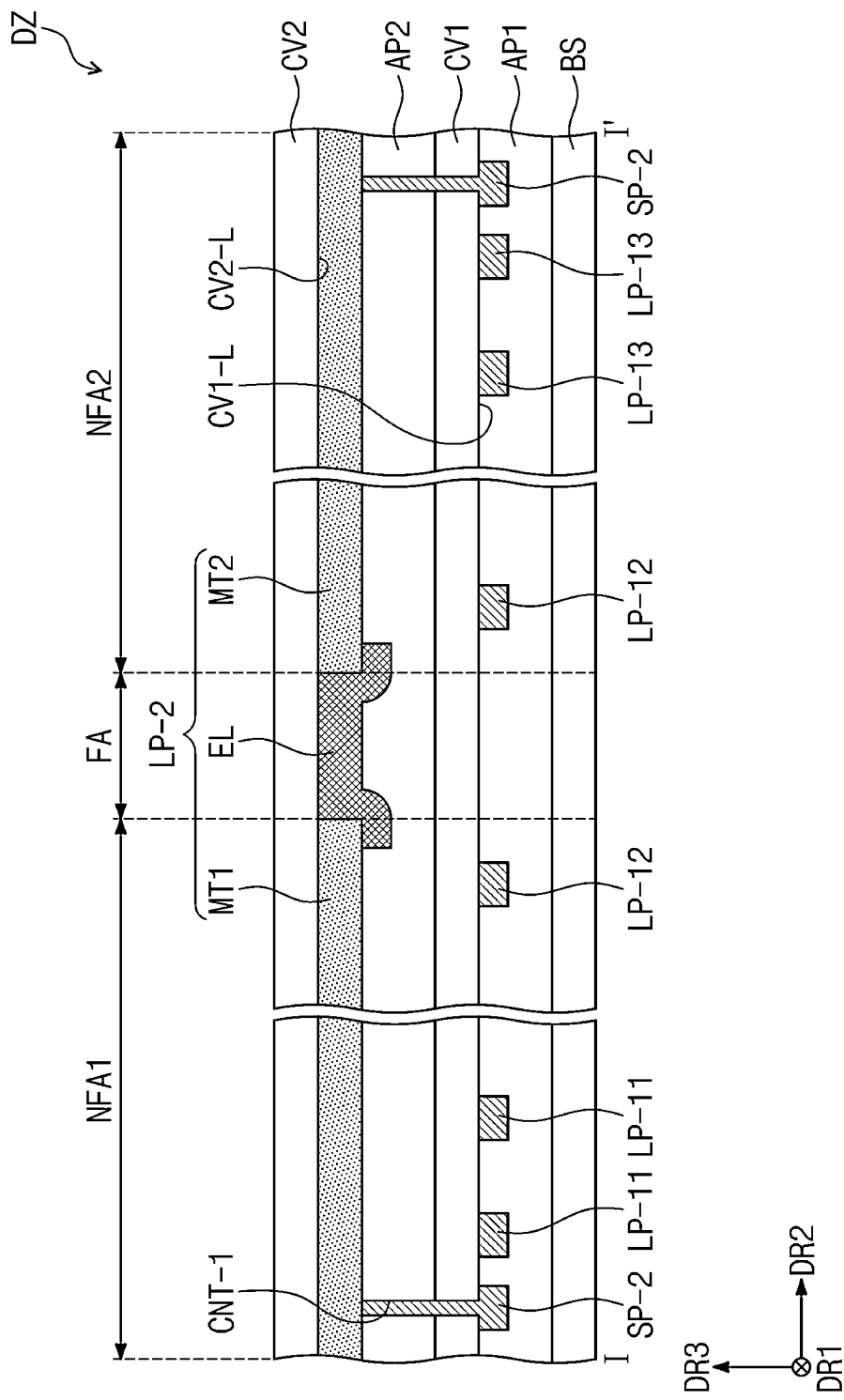
FIG. 4A is a cross-sectional view of an embodiment of a digitizer taken along line I-I' of FIG. 3 according to the invention.
Figure 5:
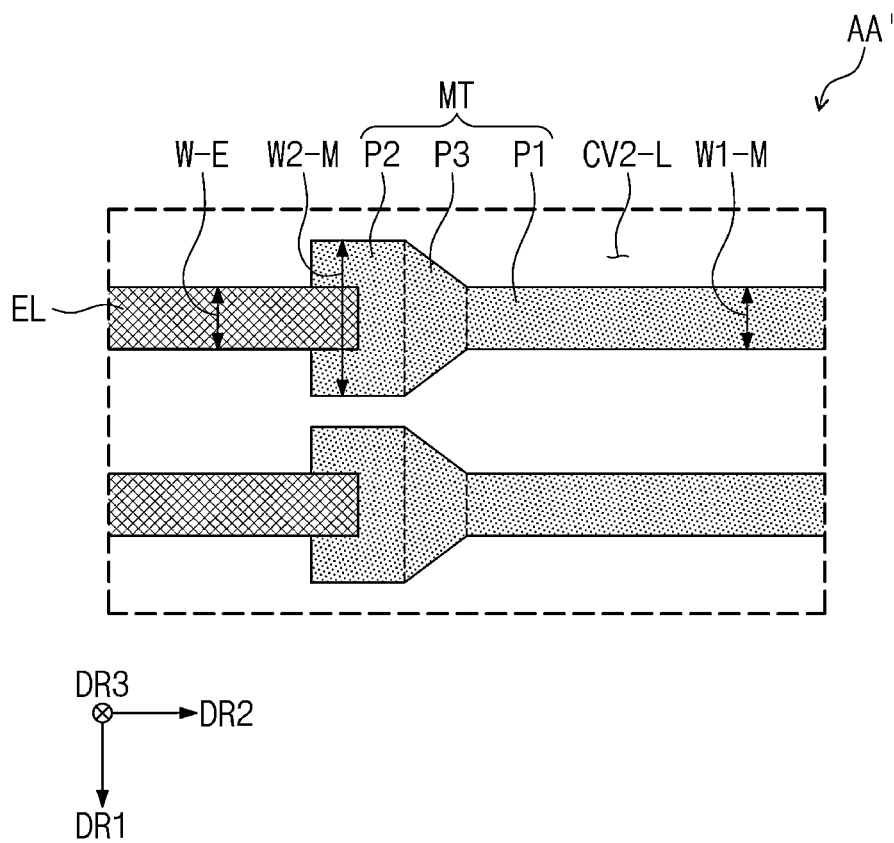
FIG. 5 is an enlarged plan view of an area AA' of FIG. 3.

FIG. 3 is a plan view of an embodiment of the digitizer DZ according to the invention. FIG. 4A is a cross-sectional view of an embodiment of the digitizer DZ taken along line I-I' of FIG. 3 according to the invention. FIG. 4B is a cross-sectional view of an embodiment of the digitizer DZ taken along line II-II' of FIG. 3 according to the invention. FIG. 5 is an enlarged plan view of an area AA' of FIG. 3.

Referring to FIG. 3, the digitizer DZ may include a folding area FA, a first non-folding area NFA1, and a second non-folding area NFA2, which respectively correspond to the folding area FA, the first non-folding area NFA1, and the second non-folding area NFA2 of the display device DD (refer to FIG. 1A).

The digitizer DZ may include a plurality of coils and a connector CT. Each of the coils may be connected to the connector CT, and the connector CT may be connected to a mother board. In an embodiment, the connector CT may be disposed adjacent to the second non-folding area NFA2 of the digitizer DZ.

Each of the coils included in the digitizer DZ may include a coil portion CNP and a line portion LNP. The coil portion CNP may be defined as an open loop. The line portion LNP may extend from the coil portion CNP and may be connected to the connector CT. The open loop may be formed or provided by disconnecting a portion of the coil portion CNP. The line portion LNP may be connected to the disconnected portions of the coil portion CNP, which face each other.

The coils may include a first group GC1 and a second group GC2 insulated from the first group GC1 while crossing the first group GC1. Each of the coils included in each of the first group GC1 and the second group GC2 may include the coil portion CNP and the line portion LNP.

In the illustrated embodiment, the first group GC1 may be defined as coils including a coil portion CNP-1 extending in the first direction DR1, and a plurality of coil portions of the first group GC1 may be arranged in the second direction DR2. The coil portion CNP-1 may include coil portions CNP-11, CNP-12, and CNP-13 respectively included in sub-coils GC1-1, GC1-2, and GC1-3 different from each other.

The coils of the first group GC1 may include a first sub-coil GC1-1, a second sub-coil GC1-2, and a third sub-coil GC1-3. The first sub-coil GC1-1 may include the coil portion CNP-11 overlapping the first non-folding area NFA1. The second sub-coil GC1-2 may include the coil portion CNP-12 overlapping the folding area FA. The third sub-coil GC1-3 may include the coil portion CNP-13 overlapping the second non-folding area NFA2.

The first, second, and third sub-coils GC1-1, GC1-2, and GC1-3 may respectively include long side portions LP-11, LP-12, and LP-13 extending in the first direction DR1 and may respectively include short side portions SP-11, SP-12, and SP-13 extending in the second direction DR2. In the illustrated embodiment, the long side portions LP-11, LP-12, and LP-13 of each of the first, second, and third sub-coils GC1-1, GC1-2, and GC1-3 may include a portion that is not disconnected and a portion where disconnected lines are spaced apart from each other.

Accordingly, the open loop defined in the coil portions CNP-11, CNP-12, and CNP-13 respectively included in the first, second, and third sub-coils GC1-1, GC1-2, and GC1-3 may have a shape formed or provided by three long sides and two short sides connecting long sides adjacent to each other. This will be described in detail later.

A line portion LNP-1 of each of the first, second, and third sub-coils GC1-1, GC1-2, and GC1-3 may be connected to the disconnected portion of the long side portions LP-11, LP-12, and LP-13. The line portion LNP-1 may include line portions LNP-11, LNP-12, and LNP-13 respectively included in first, second, and third sub-coils GC1-1, GC1-2, and GC1-3 different from one another.

The line portion LNP-11 of the first sub-coil GC1-1 may overlap the first non-folding area NFA1, the folding area FA, and the second non-folding area NFA2. The line portions LNP-12 and LNP-13 respectively included in the second sub-coil GC1-2 and the third sub-coil GC1-3 may overlap the second non-folding area NFA2.

FIG. 3 shows the first, second, and third sub-coils GC1-1, GC1-2, and GC1-3 included in the first group GC1 as one coil overlapping each of the first non-folding area NFA1, the folding area FA, and the second non-folding area NFA2 as an illustrative embodiment. However, the first, second, and third sub-coils GC1-1, GC1-2, and GC1-3 included in the first group GC1 may be provided in n (n is a natural number) coils arranged in the second direction DR2 and spaced apart from each other, and they should not be particularly limited.

In the illustrated embodiment, the second group GC2 may be defined as coils including a coil portion CNP-2 extending in the second direction DR2, and a plurality of coil portions of the second group GC2 may be arranged in the first direction DR1. The coil portion CNP-2 of the second group GC2 may overlap the folding area FA.

Each of the coils of the second group GC2 may include a long side portion LP-2 extending in the second direction DR2 and a short side portion SP-2 extending in the first direction DR1. In the illustrated embodiment, the long side portion LP-2 of each of the coils of the second group GC2 may include a portion that is not disconnected and a portion where disconnected lines are spaced apart from each other. Accordingly, the open loop defined in the coil portions CNP-2 of the second group GC2 may have a shape formed or provided by three long sides and two short sides connecting long sides adjacent to each other.

A line portion LNP-2 of each of the coils of the second group GC2 may be connected to the disconnected portion of the long side portion LP-2. The line portion LNP-2 of each of the coils of the second group GC2 may overlap the second non-folding area NFA2 and may not overlap the folding area FA.

FIG. 3 shows two coils included in the second group GC2 as an illustrative embodiment. The coils included in the second group GC2 may be provided in m (m is a natural number) coils arranged in the first direction DR1 and spaced apart from each other, however, they should not be particularly limited.

As shown in FIG. 3, the coil portion CNP-12 of each of the second sub-coils GC1-2 and the line portion LNP-11 of each of the first sub-coils GC1-1 of the first group GC1 and the coil portion CNP-2 of each of the second group GC2 may overlap the folding area FA.

Hereinafter, for the convenience of explanation, the coil portion CNP-12 of each of the second sub-coils GC1-2 and the line portion LNP-11 of each of the first sub-coils GC1-1 of the first group GC1 and the coil portion CNP-2 of each of the second group GC2 may be also referred to as folding portions. Each of the folding portions may extend in the second direction DR2 in the folding area FA, and thus, the folding portions may be damaged due to a tensile stress when being folded.

In the invention, each of the folding portions may include a flexible portion EL and rigid portions MT1 and MT2, which have different physical properties. The flexible portion EL may overlap the folding area FA, and the rigid portions MT1 and MT2 may overlap the first and second non-folding areas NFA1 and NFA2 respectively. In FIG. 3, the flexible portion EL is illustrated as a bold line compared to the other portions to show a difference in material or physical properties from other components, and this does not mean that there is a difference in line width between the components.

In the illustrated embodiment, the rigid portions MT1 and MT2 may have a resistivity and a fracture strain, which are smaller than those of the flexible portion EL. In an embodiment, the rigid portions MT1 and MT2 may not include a flexible conductor and may include copper. The flexible portion EL may include the flexible conductor. The flexible conductor may include a conductive filler and a flexible polymer. As the flexible portion EL includes the conductive filler, the flexible portion EL may have an electrical conductivity, and as the flexible portion EL includes the flexible polymer, the flexible portion EL may have an elasticity.

The conductive filler may include at least one of copper, silver, and graphite. The flexible polymer may include at least one of a styrene-butadiene rubber, a butadiene rubber, a butyl rubber, a silicone rubber, and a urethane rubber.

In an embodiment, the flexible portion EL may have a fracture strain of about 2% or more. When the fracture strain of the flexible portion EL is smaller than about 2%, damages on the lines overlapping the folding area FA may not be prevented due to lack of elasticity of the flexible portion EL when the digitizer DZ is folded.

In an embodiment, the resistivity of the flexible portion EL may be equal to or greater than about $1.72 \times 10^{-8}$ ohm-meter ($\Omega \cdot m$) and equal to or smaller than about $1.00 \times 10^{-4}$ $\Omega \cdot m$. In a case where the resistivity is smaller than about $1.72 \times 10^{-8}$ $\Omega \cdot m$, the proportion of the flexible polymer decreases, and thus, the flexible portion EL may not have the elasticity sufficient to prevent the line from being damaged, and in a case where the resistivity is greater than about $1.00 \times 10^{-4}$ Ω·m, the electrical conductivity may decrease, and thus, the external input may not be sensed.

The fracture strain and the resistivity of each of the folding portions may be determined by the proportion of the conductive filler and the flexible polymer. As the proportion of the flexible polymer increases, the fracture strain of the flexible portion EL may increase, and the resistivity may increase.

In an embodiment, the rigid portions MT1 and MT2 may overlap the first non-folding area NFA1 and the second non-folding area NFA2, respectively. The flexible portion EL may overlap the folding area FA and may be disposed between the rigid portions MT1 and MT2.

According to the invention, as the lines extending in the second direction DR2 include the flexible portion EL having the large fracture strain and the small resistivity in the portion overlapping the folding area FA, cracks in the lines, which are caused by the tensile stress applied to the lines during the folding of the display device DD (refer to FIG. 1A), may be prevented.

Referring to FIG. 4A, the digitizer DZ may include a base layer BS, a first adhesive layer AP1 disposed on the base layer BS, a first cover layer CV1 disposed on the first adhesive layer AP1, a second adhesive layer AP2 disposed on the first cover layer CV1, and a second cover layer CV2 disposed on the second adhesive layer AP2. In this case, the base layer BS, the first adhesive layer AP1, the first cover layer CV1, the second adhesive layer AP2, and the second cover layer CV2 may be stacked in an order from the second cover layer CV2 to the base layer BS, that is, along a direction opposite to the third direction DR3 while being manufactured.

In an embodiment, each of the base layer BS, the first cover layer CV1, and the second cover layer CV2 may include a polymer resin. In an embodiment, each of the base layer BS, the first cover layer CV1, and the second cover layer CV2 may include polyimide.

As shown in FIG. 4A, the long side portion LP-2 of each of the coils of the second group GC2 (refer to FIG. 3) may be disposed between the first cover layer CV1 and the second cover layer CV2. In an embodiment, the long side portion LP-2 of the second group GC2 may be disposed on a rear surface CV2-L of the second cover layer CV2, which faces the first cover layer CV1.

According to the invention, the flexible portion EL and the rigid portions MT1 and MT2 may be included in the long side portion LP-2 of the second group GC2. Opposite ends of the flexible portion EL may cover one end of a first rigid portion MT1 overlapping the first non-folding area NFA1 and one end of a second rigid portion MT2 overlapping the second non-folding area NFA2, respectively. Accordingly, a step difference may be formed or provided at opposite ends of the flexible portion EL.

The second adhesive layer AP2 may be disposed between the first cover layer CV1 and the second cover layer CV2 and may cover the long side portions LP-2 of the second group GC2.

The long side portions LP-11, LP-12, and LP-13 of the first group GC1 (refer to FIG. 3) may be disposed between the base layer BS and the first cover layer CV1. In an embodiment, the long side portions LP-11, LP-12, and LP-13 of the first group GC1 may be disposed on a rear surface CV1-L of the first cover layer CV1, which faces the base layer BS.

The first adhesive layer AP1 may be disposed between the base layer BS and the first cover layer CV1 and may cover the long side portions LP-11, LP-12, and LP-13 of the first group GC1.

The long side portion LP-11 of each of the first sub-coils GC1-1 (refer to FIG. 3) may overlap the first non-folding area NFA1, and the long side portion LP-13 of each of the third sub-coils GC1-3 (refer to FIG. 3) may overlap the second non-folding area NFA2. The long side portion LP-12 of each of the second sub-coils GC1-2 (refer to FIG. 3) may include a portion overlapping the first non-folding area NFA1 and a portion overlapping the second non-folding area NFA2.

In an embodiment, the short side portion SP-2 of the second group GC2 (refer to FIG. 3) may be disposed on the rear surface CV1-L of the first cover layer CV1. In the second group GC2, the short side portion SP-2 may be disposed in a layer different from a layer in which the long side portion LP-2 is disposed, and the short side portion SP-2 and the long side portion LP-2 may be connected to each other via a contact hole CNT-1 defined through the first cover layer CV1 and the second adhesive layer AP2.

However, the position of the short side portions SP-2 of the second group GC2 should not be limited thereto or thereby. In an embodiment, the short side portions SP-2 and the long side portions LP-2 of the second group GC2 may be disposed in the same layer as each other.

Referring to FIG. 4B, the short side portion SP-12 of the second sub-coil GC1-2 (refer to FIG. 3) of the first group GC1 (refer to FIG. 3) may be disposed between the first cover layer CV1 and the second cover layer CV2. In an embodiment, the short side portion SP-12 of the second sub-coil GC1-2 may be disposed on the rear surface CV2-L of the second cover layer CV2, which faces the first cover layer CV1.

According to the invention, the short side portion SP-12 of the second sub-coil GC1-2 may include the flexible portion EL overlapping the folding area FA and the first and second rigid portions MT1 and MT2 respectively overlapping the first and second non-folding areas NFA1 and NFA2.

The short side portion SP-12 of the second sub-coil GC1-2 may be connected to the long side portion LP-12 via a contact hole CNT-2 defined through the first cover layer CV1 and the second adhesive layer AP2.

FIG. 5 is a plan view of the second cover layer CV2 (refer to FIG. 4A) viewed from the rear surface CV2-L.

In the illustrated embodiment, a rigid portion MT may include a first portion P1 having a first width W1-M in the first direction DR1, a second portion P2 having a second width W2-M in the first direction DR1, and a third portion P3 disposed between the first portion P1 and the second portion P2 and having a variable width in the first direction DR1.

The second width W2-M of the second portion P2 may be greater than the first width W1-M of the first portion P1, and the width of the third portion P3 may increase from the first portion P1 to the second portion P2.

In the illustrated embodiment, at least a portion of the second portion P2 of the rigid portion MT may be covered by the flexible portion EL, and a width W-E in the first direction DR1 of the flexible portion EL may be smaller than the second width W2-M of the rigid portion MT.

In the invention, the flexible portion EL may be formed or provided by a printing process. In this case, the flexible portion EL may be provided as a paste state at the beginning of the process.

Since the rigid portion MT has a relatively large width in the portion overlapping the flexible portion EL compared to the other portions, the flexible portion EL may be misaligned due to a process tolerance in the process of providing the flexible portion EL as the paste state in a case where an interval between the flexible portions adjacent to each other among the flexible portions EL arranged in the first direction DR1 is not sufficiently set. In an embodiment, since the flexible portion EL may not cover one end of a predetermined rigid portion MT, which is to be covered, but may cover one end of a rigid portion MT adjacent to the predetermined rigid portion MT, a malfunction in recognition of the pen PN (refer to FIG. 1A) may occur.

According to the invention, the coils may include a first coil and a second coil, which are closest to each other. In the invention, the first coil and the second coil disposed adjacent to the first coil may be coils adjacent to each other among different coils included in the first group GC1 or coils adjacent to each other among different coils included in the second group GC2, however, they should not be particularly limited. Accordingly, a portion of the first coil and the second coil adjacent to the first coil may overlap the folding area FA.

Each of the first coil and the second coil may include the coil portion CNP (refer to FIG. 3) or the line portion LNP (refer to FIG. 3), which overlaps the folding area FA. According to the invention, the misalignment of the flexible portion EL, which occurs in the printing process, may be prevented by setting a predetermined distance between the coil portion CNP of the first coil and the coil portion CNP of the second coil or between the line portion LNP of the first coil and the line portion LNP of the second coil, which overlap the folding area FA, and thus, a printing yield may be improved. Therefore, the reliability of the digitizer DZ (refer to FIG. 2A) with respect to the input sensing of the pen PN (refer to FIG. 1A) may be improved.

Figure 6A:
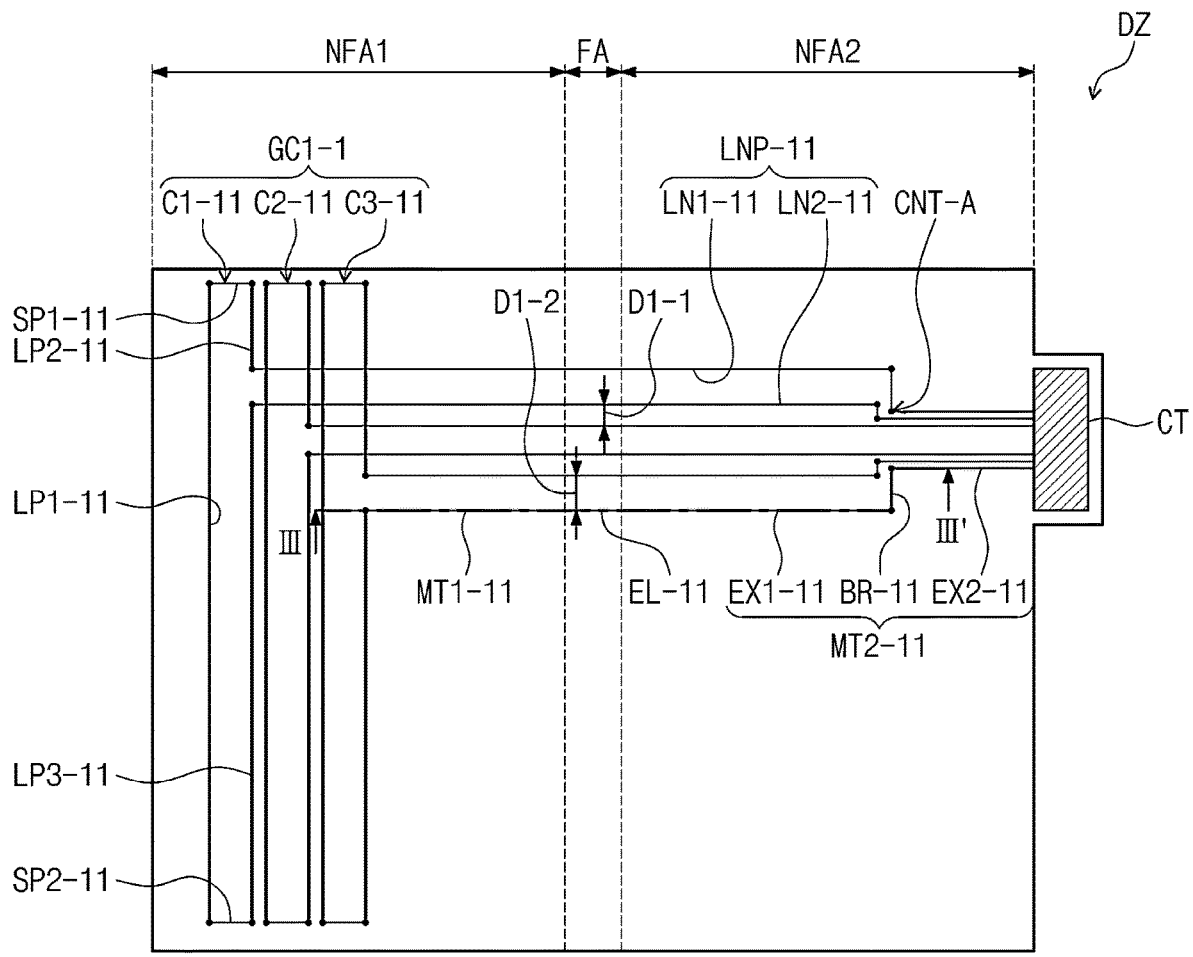
FIG. 6A is a plan view of a portion of an embodiment of a coil of a digitizer according to the invention.
Figure 6A:
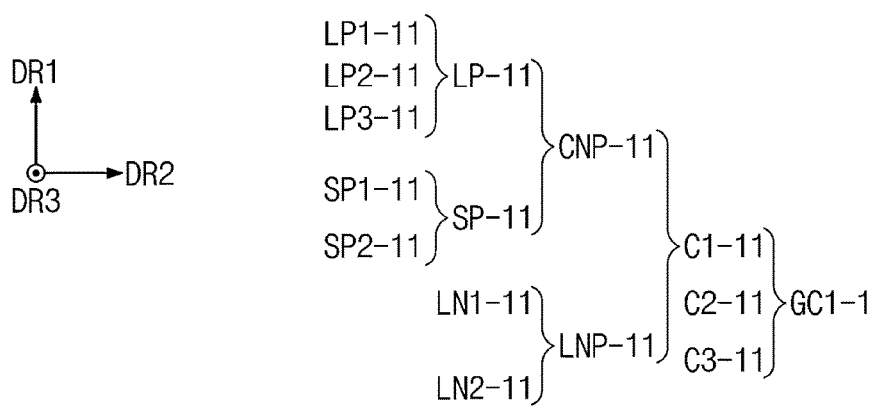
Figure 6B:
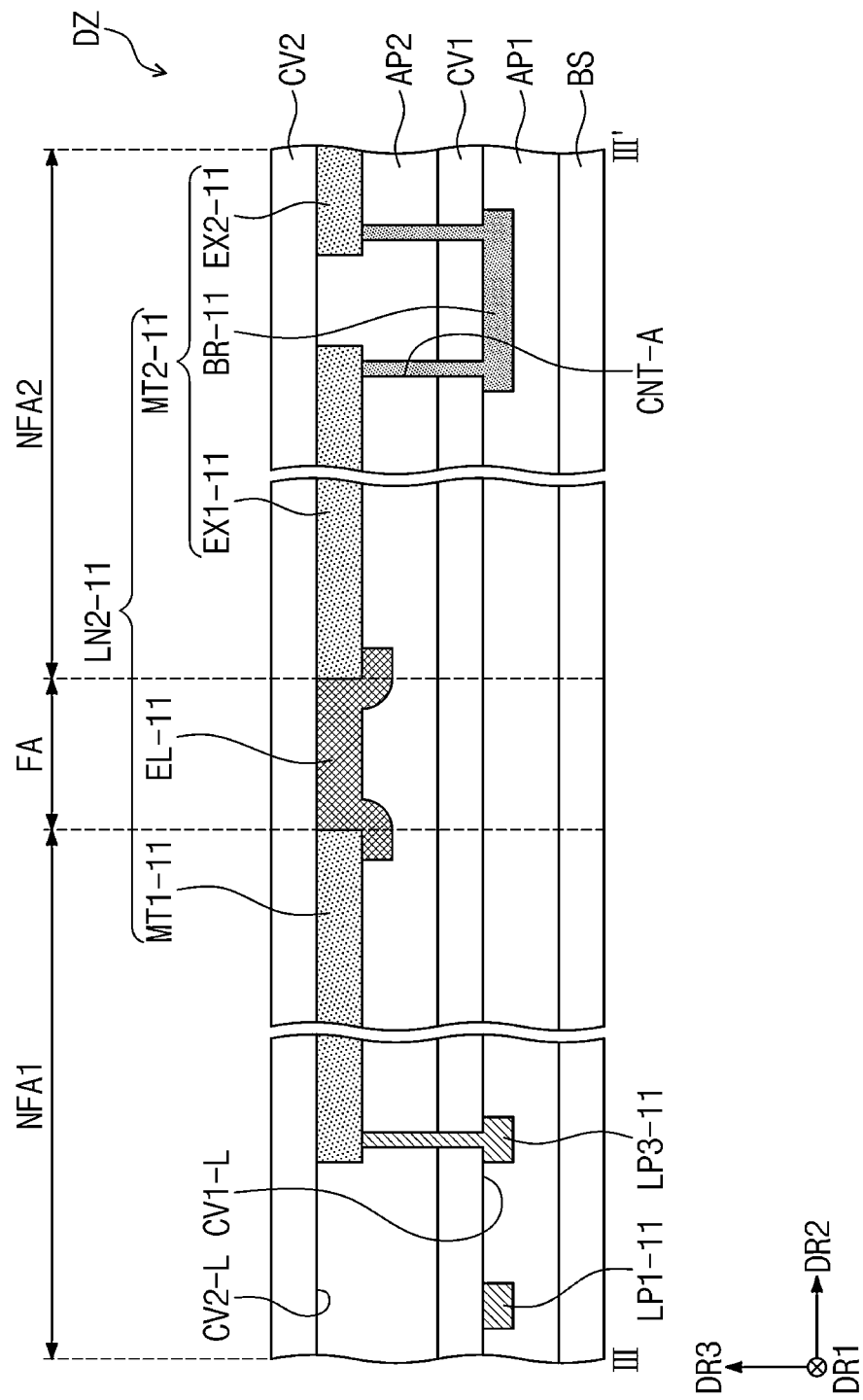
FIG. 6B is a cross-sectional view of a digitizer taken along line III-III' of FIG. 6A according to the invention.

FIG. 6A is a plan view of an embodiment of a portion of a coil of a digitizer according to the invention. FIG. 6B is a cross-sectional view of an embodiment of the digitizer taken along line III-III' of FIG. 6A according to the invention. For the convenience of explanation, FIG. 6A shows only first sub-coils GC1-1 of a first group GC1 among the coils described with reference to FIG. 3, and hereinafter, the first sub-coils GC1-1 will be mainly described.

FIG. 6A shows a first coil C1-11, a second coil C2-11, and a third coil C3-11 among the first sub-coils GC1-1, which are sequentially arranged in a direction from a first non-folding area NFA1 to a folding area FA.

Each of the first, second, and third coils C1-11, C2-11, and C3-11 may include a coil portion CNP-11 and a line portion LNP-11. The coil portion CNP-11 may include a long side portion LP-11 and a short side portion SP-11.

The long side portion LP-11 may include a first long side portion LP1-11 extending in the first direction DR1, a second long side portion LP2-11 spaced apart from the first long side portion LP1-11 in the second direction DR2, and a third long side portion LP3-11 spaced apart from the first long side portion LP1-11 in the second direction DR2 and spaced apart from the second long side portion LP2-11 in the first direction DR1. In this case, each of the second long side portion LP2-11 and the third long side portion LP3-11 may face the first long side portion LP1-11.

The short side portion SP-11 may include a first short side portion SP1-11 connecting one end of the first long side portion LP1-11 and one end of the second long side portion LP2-11 and a second short side portion SP2-11 connecting an opposite end of the first long side portion LP1-11 and one end of the third long side portion LP3-11. The first short side portion SP1-11 and the second short side portion SP2-11 may be spaced apart from each other in the first direction DR1.

The line portion LNP-11 may include a first line portion LN1-11 extending from an opposite end of the second long side portion LP2-11 and a second line portion LN2-11 extending from an opposite end of the third long side portion LP3-11.

In the illustrated embodiment, each of the first and second line portions LN1-11 and LN2-11 may include a flexible portion EL-11 overlapping the folding area FA and a first rigid portion MT1-11 disposed between the coil portion CNP-11 and the flexible portion EL-11. The flexible portion EL-11 and the first rigid portion MT1-11 may extend in the second direction DR2, and the first and second line portions LN1-11 and LN2-11 may be spaced apart from each other in the first direction DR1.

According to the invention, a distance D1-1 between line portions LNP-11 different from each other and adjacent to each other among the first sub-coils GC1-1 may be equal to or greater than about 100 micrometers and equal to or smaller than about 1 centimeter in an area overlapping the folding area FA.

That is, the distance D1-1 may correspond to a distance between the line portion LNP-11 of the first coil C1-11 and the line portion LNP-11 of the second coil C2-11 among the first, second, and third coils C1-11, C2-11, and C3-11 or a distance between the line portion LNP-11 of the second coil C2-11 and the line portion LNP-11 of the third coil C3-11 among the first, second, and third coils C1-11, C2-11, and C3-11.

A predetermined distance between the line portion LNP (refer to FIG. 3) of the first coil and the line portion LNP of the second coil, which are closest to each other, may correspond to the distance D1-1.

In an embodiment, in the area overlapping the folding area FA, a distance D1-2 between the first and second line portions LN1-11 and LN2-11 of each of the first, second, and third coils C1-11, C2-11, and C3-11 may be equal to or greater than about 100 micrometers and equal to or smaller than about 1 centimeter.

That is, at least one of the distance between the first and second line portions LN1-11 and LN2-11 of the first coil C1-11, the distance between the first and second line portions LN1-11 and LN2-11 of the second coil C2-11, and the distance between the first and second line portions LN1-11 and LN2-11 of the third coil C3-11 may mean the predetermined distance D1-2.

In this case, when the distances D1-1 and D1-2 are smaller than about 100 micrometers, the flexible portion EL-11 may be misaligned due to the process tolerance occurring during the printing process of the flexible portion EL-11, and as a result, the sensing performance with respect to the input by the pen PN (refer to FIG. 1A) may be deteriorated. When the distances D1-1 and D1-2 are greater than about 1 centimeter, the sensing performance may not be fully exhibited because an area where the sensing of the input by the pen PN is not possible is widened or an unit area where the input by the pen PN is sensed is widened.

In an embodiment, each of the first and second line portions LN1-11 and LN2-11 may further include a second rigid portion MT2-11 spaced apart from the first rigid portion MT1-11 with the flexible portion EL-11 interposed therebetween in the second direction DR2.

The second rigid portion MT2-11 may include a first extension portion EX1-11, a second extension portion EX2-

11, and a bridge BR-11. The first extension portion EX1-11 may be connected to the flexible portion EL-11 and may extend in the second direction DR2. The second extension portion EX2-11 may be spaced apart from the first extension portion EX1-11 and may extend in the second direction DR2. The bridge BR-11 may extend in the first direction DR1 and may connect the first extension portion EX1-11 to the second extension portion EX2-11.

Referring to FIG. 6B, the bridge BR-11 may be disposed in a layer different from a layer in which the first extension portion EX1-11 and the second extension portion EX2-11 are disposed. In an embodiment, the first and second extension portions EX1-11 and EX2-11 may be disposed on a rear surface CV2-L of a second cover layer CV2, and the bridge BR-11 may be disposed on a rear surface CV1-L of a first cover layer CV1. In this case, the first and second extension portions EX1-11 and EX2-11 may be connected to the bridge BR-11 via a contact hole CNT-A defined through the first cover layer CV1. In FIG. 6A, the contact hole CNT-A is illustrated as a dot.

Referring back to FIG. 6A, the bridge BR-11 may be disposed in a same layer as a layer in which the first, second, and third long side portions LP1-11, LP2-11, and LP3-11 are disposed, and the first rigid portion MT1-11 and the flexible portion EL-11 may be disposed in a layer different from the layer in which the first, second, and third long side portions LP1-11, LP2-11, and LP3-11 are disposed. In this case, the first rigid portion MT1-11 of the first line portion LN1-11 may be connected to the second long side portion LP2-11 via the contact hole CNT-A, and the first rigid portion MT1-11 of the second line portion LN2-11 may be connected to the third long side portion LP3-11 via the contact hole CNT-A. However, arrangements of the first and second extension portions EX1-11 and EX2-11 should not be particularly limited.

In the illustrated embodiment, since at least one line portion LNP-11 includes the bridge BR-11, a distance between the second extension portions adjacent to each other among the second extension portions EX2-11 may be smaller than a distance between the first extension portions adjacent to each other among the first extension portions EX1-11.

That is, even though a distance between the first and second line portions LN1-11 and LN2-11 of the line portion LNP-11 is wide in the folding area FA, the distance between the first and second line portions LN1-11 and LN2-11 may be reduced in the vicinity of a connector CT by the bridge BR-11.

Accordingly, since all the line portions LNP (refer to FIG. 3) of the coils are desired to be connected to the connector CT arranged in a limited space, the line portions LNP-11 of the first sub-coils GC1-1 of the illustrated embodiment may be designed regardless of the limited space.

In an embodiment, a line width of the bridge BR-11 along the second direction DR2 may be smaller than a half (½) of a line width of the first to third long side portions LP1-11, LP2-11, and LP3-11 along the second direction DR2. The bridge BR-11 may be included in the line portion LNP-11 transmitting the signals sensed by the coil portion CNP-11 and may be thinner than a line of the coil portion CNP-11, and thus, information about the input by the pen PN (refer to FIG. 1A) may be prevented from being sensed in an area other than the coil portion CNP-11.

Figure 7:
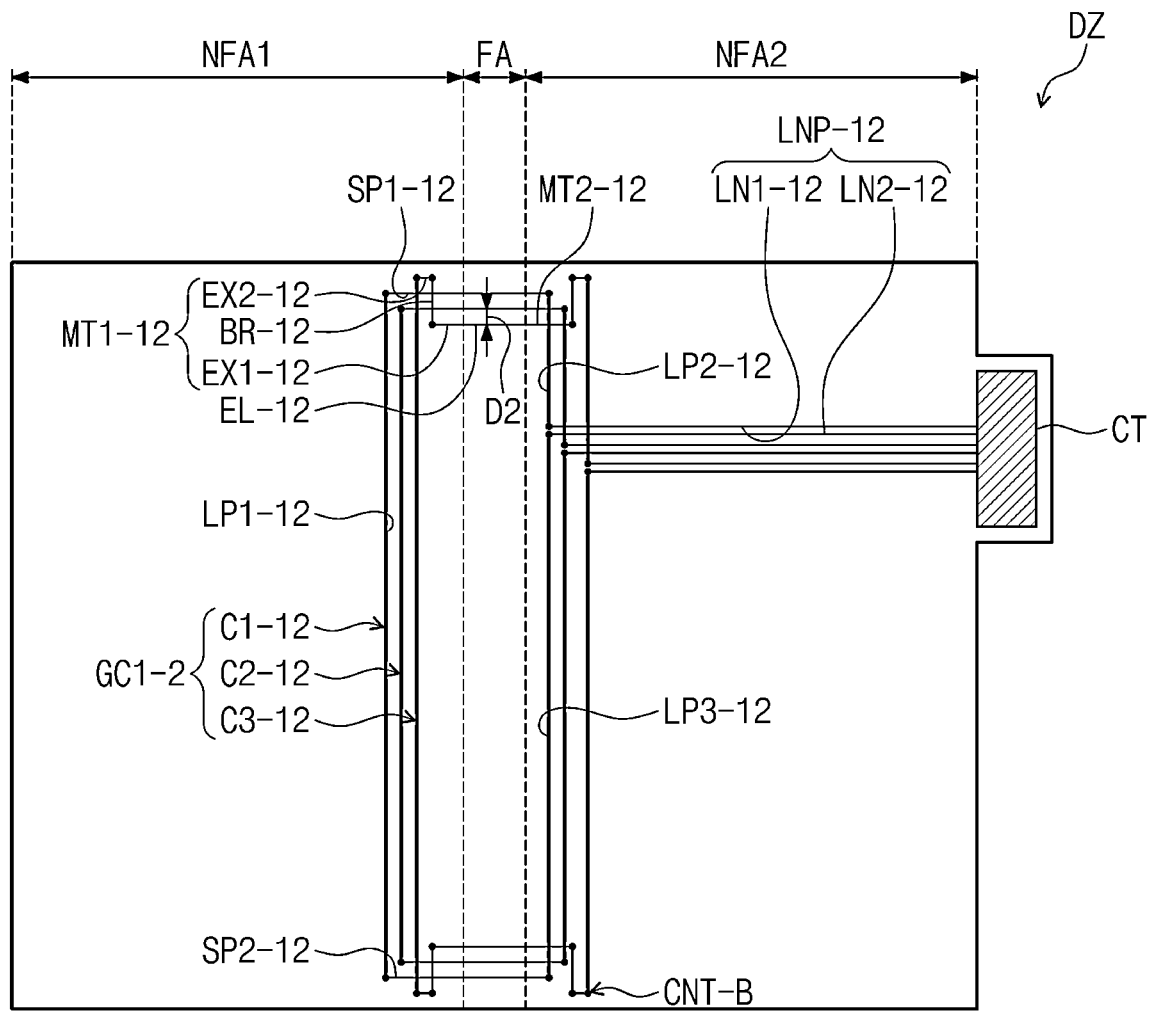
FIG. 7 is a plan view of an embodiment of a portion of a coil of a digitizer according to the invention.
Figure 7:
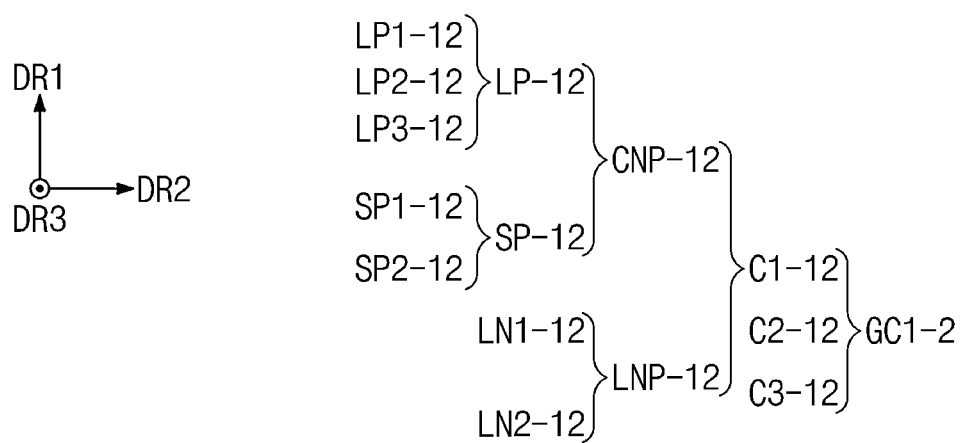

FIG. 7 is a plan view of an embodiment of a portion of a coil of a digitizer DZ according to the invention. For the convenience of explanation, FIG. 7 shows only second sub-coils GC1-2 of a first group GC1 among the coils described with reference to FIG. 3, and hereinafter, the second sub-coils GC1-2 will be mainly described.

FIG. 7 shows three coils C1-12, C2-12, and C3-12 among second sub-coils GC1-2, and for the convenience of explanation, second sub-coils GC1-2 sequentially arranged in a direction from a first non-folding area NFA1 to a second non-folding area NFA2 are also referred to as a first coil C1-12, a second coil C2-12, and a third coil C3-12, respectively.

The three second sub-coils GC1-2 shown in FIG. 7 are merely one of embodiments, and the number of the second sub-coils GC1-2 should not be limited to three. In an embodiment, the number of the second sub-coils GC1-2 may be equal to or greater than 2 and equal to or smaller than 5. The digitizer DZ in the illustrated embodiment may include a coil portions CNP-12 overlapping a folding area FA, and thus, it is possible to sense whether the input by the pen PN (refer to FIG. 1B) occurs in the folding area FA.

Each of the first, second, and third coils C1-12, C2-12, and C3-12 may include a coil portion CNP-12 and a line portion LNP-12. The coil portion CNP-12 may include a long side portion LP-12 and a short side portion SP-12.

The long side portion LP-12 may include a first long side portion LP1-12 extending in the first direction DR1, a second long side portion LP2-12 spaced apart from the first long side portion LP1-12 in the second direction DR2, and a third long side portion LP3-12 spaced apart from the first long side portion LP1-12 in the second direction DR2 and spaced apart from the second long side portion LP2-12 in the first direction DR1. In this case, each of the second long side portion LP2-12 and the third long side portion LP3-12 may face the first long side portion LP1-12.

The short side portion SP-12 may include a first short side portion SP1-12 connecting one end of the first long side portion LP1-12 to one end of the second long side portion LP2-12 and a second short side portion SP2-12 connecting an opposite end of the first long side portion LP1-12 to one end of the third long side portion LP3-12. The first short side portion SP1-12 and the second short side portion SP2-12 may be spaced apart from each other in the first direction DR1.

The line portion LNP-12 may include a first line portion LN1-12 extending from an opposite end of the second long side portion LP2-12 and a second line portion LN2-12 extending from an opposite end of the third long side portion LP3-12.

In the illustrated embodiment, each of the first and second short side portions SP1-12 and SP2-12 may overlap the folding area FA. Each of the first and second short side portions SP1-12 and SP2-12 may include a flexible portion EL-12 and rigid portions MT1-12 and MT2-12 spaced apart from each other with the flexible portion EL-12 interposed therebetween.

In an embodiment, the short side portion SP-12 of each of the first, second, and third coils C1-12, C2-12, and C3-12 may include one flexible portion EL-12 and two rigid portions MT1-12 and MT2-12 spaced apart from each other in the second direction DR2 with respect to the flexible portion EL-12 as shown in FIG. 7.

However, the invention should not be limited thereto or thereby, and the flexible portion EL-12 may be connected to one end of the second long side portion LP2-12 or may be connected to one end of the third long side portion LP3-12 in some coils of the second sub-coils GC1-2. That is, the short side portion SP-12 may include one flexible portion and one rigid portion.

According to the invention, in an area overlapping the folding area FA, a distance D2 between the short side portions SP-12 adjacent to each other among the second sub-coils GC1-2 of the first group GC1 may be equal to or greater than about 100 micrometers and equal to or smaller than about 1 centimeter.

That is, the distance D2 may correspond to a distance between the short side portion SP-12 of the first coil C1-12 and the short side portion SP-12 of the second coil C2-12 or a distance between the short side portion SP-12 of the second coil C2-12 and the short side portion SP-12 of the third coil C3-12 among the first, second, and third coils C1-12, C2-12, and C3-12.

The distance between the coil portion CNP (refer to FIG. 3) of the first coil and the coil portion CNP of the second coil, which are closest to each other, may correspond to the distance D2.

In an embodiment, at least one of the rigid portions MT1-12 and MT2-12 included in the third coil C3-12 may include a first extension portion EX1-12, a second extension portion EX2-12, and a bridge BR-12. The first extension portion EX1-12 may be connected to the flexible portion EL-12 and may extend from the flexible portion EL-12 in the second direction DR2. The second extension portion EX2-12 may be spaced apart from the first extension portion EX1-12, may extend in the second direction DR2, and may be connected to one end of the long side portion LP-12. The bridge BR-12 may extend in the first direction DR1 and may connect the first extension portion EX1-12 to the second extension portion EX2-12.

As shown in FIG. 7, each of the second rigid portion MT2-12 of the first short side portion SP1-12, the first rigid portion MT1-12 of the second short side portion SP2-12, and the second rigid portion MT2-12 of the second short side portion SP2-12 may include the first extension portion EX1-12, the second extension portion EX2-12, and the bridge BR-12.

In this case, the second extension portion EX2-12 may be disposed closer to one end of the base layer BS (refer to FIG. 4A) in the first and second short side portions SP1-12 and SP2-12 than the first extension portion EX1-12 is. That is, in the area overlapping the folding area FA, although the distance between the short side portions SP-12 of the coils adjacent to each other corresponds to the predetermined distance D2, a length of the long side portions LP-12 may not be reduced.

In an embodiment, a distance between the first short side portion SP1-12 and the second short side portion SP2-12 overlapping the folding area FA of the third coil C3-12 may be smaller than a distance between the first short side portion SP1-12 and the second short side portion SP2-12 overlapping the folding area FA of the second coil C2-12, however, a length of each of the first long side portion LP1-12 and the second long side portion LP2-12 of the third coil C3-12 may be greater than a length of each of the first long side portion LP1-12 and the second long side portion LP2-12 of the second coil C2-12.

Accordingly, as the third coil C3-12 includes the bridge BR-12, the short side portions SP-12 of the coils adjacent to each other may be spaced apart from each other by the distance D2, and the area where the input by the pen PN is sensed may be prevented from decreasing.

In an embodiment, the bridge BR-12 may be disposed in a layer different from a layer in which the first extension portion EX1-12 is disposed. In addition, the bridge BR-12 may be disposed in a layer different from a layer in which the second extension portion EX2-12 is disposed. In an embodiment, each of the first and second extension portions EX1-12 and EX2-12 may be disposed on the rear surface CV2-L of the second cover layer CV2 described with reference to FIG. 4A, and the bridge BR-12 may be disposed on the rear surface CV1-L of the first cover layer CV1 described with reference to FIG. 4A. In this case, the first and second extension portions EX1-12 and EX2-12 may be connected to the bridge BR-12 via a contact hole CNT-B defined through the first cover layer CV1, and the contact hole CNT-B is illustrated as a dot in FIG. 7.

In an embodiment, a line width of the bridge BR-12 along the second direction DR2 may be smaller than a half (½) of a line width of the first, second, and third long side portions LP1-12, LP2-12, and LP3-12 along the second direction DR2.

The shape and number of the bridges BR-12 shown in FIG. 7 are merely some of embodiments, and they should not be particularly limited. The shape of the bridge BR-12 is not limited as long as its shape is enough to control the distance D2 between the short side portions SP-12 of the adjacent coils, and the number of the bridge BR-12 is not limited as long as the number is sufficient to control the distance D2 between the short side portions SP-12 of the adjacent coils.

In the illustrated embodiment, the line portion LNP-12 may include the first line portion LN1-12 and the second line portion LN2-12. One end of the first line portion LN1-12 may be connected to an opposite end of the second long side portion LP2-12 and may extend in the second direction DR2, and an opposite end of the first line portion LN1-12 may be connected to a connector CT. One end of the second line portion LN2-12 may be connected to an opposite end of the third long side portion LP3-12 and may extend in the second direction DR2, and an opposite end of the second line portion LN2-12 may be connected to the connector CT.

Each of the first line portion LN1-12 and the second line portion LN2-12 may overlap the second non-folding area NFA2 and may not overlap the folding area FA.

Figure 8:
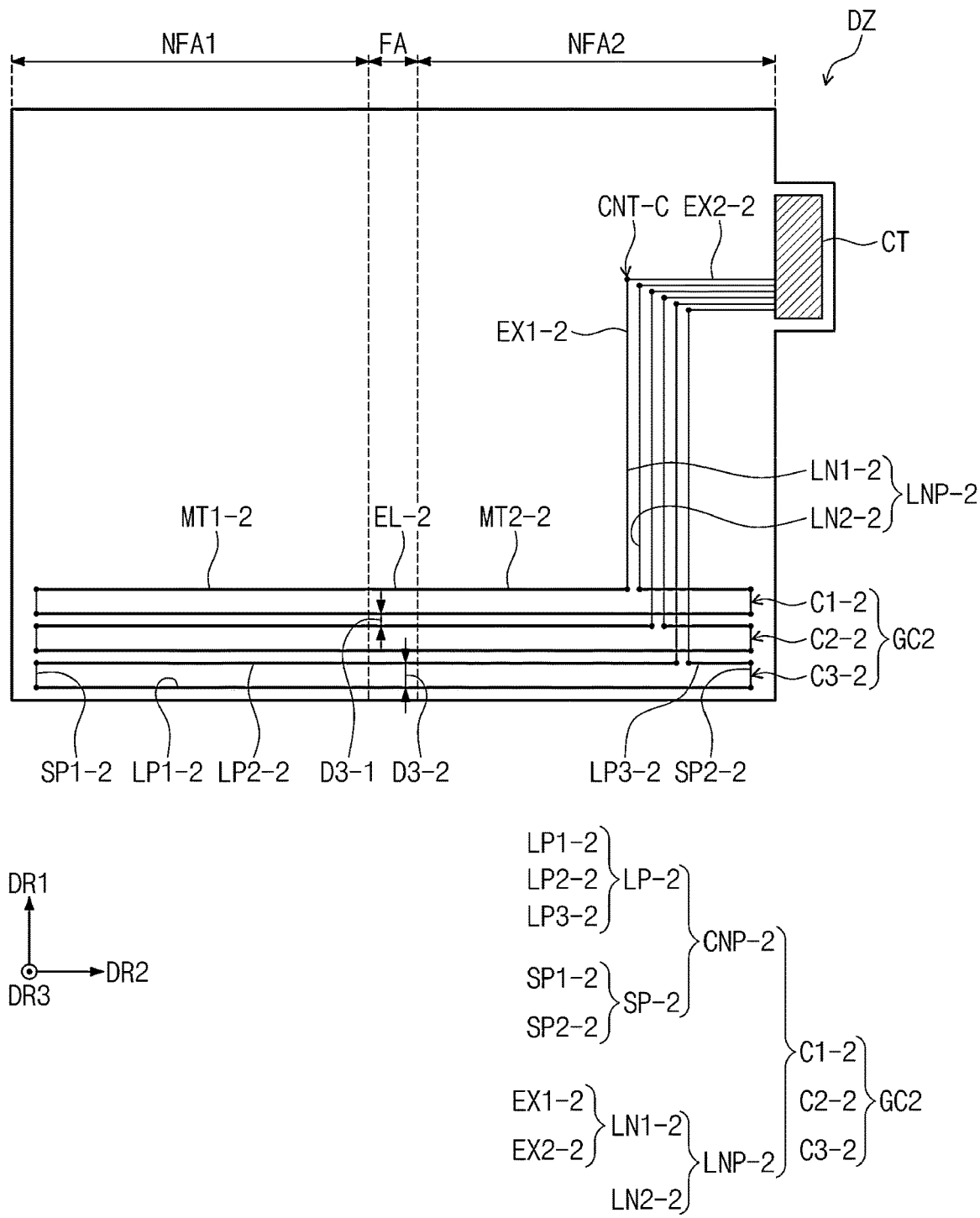
FIG. 8 is a plan view of an embodiment of a portion of a coil of a digitizer according to the invention.

FIG. 8 is a plan view of an embodiment of a portion of a coil of a digitizer DZ according to the invention. For the convenience of explanation, FIG. 8 shows only coils of a second group GC2, and hereinafter, the second group GC2 will be mainly described.

FIG. 8 shows three coils disposed at a lower side among the coils of the second group GC2, which are sequentially arranged in the first direction DR1, as an illustrative embodiment, and the coils of the second group GC2, which are sequentially arranged in a direction from an upper side to the lower side, are also referred to as a first coil C1-2, a second coil C2-2, and a third coil C3-2.

In the illustrated embodiment, each of the first, second, and third coils C1-2, C2-2, and C3-2 may include a long side portion LP-2 and a short side portion SP-2. The long side portion LP-2 may extend in the second direction DR2, and the short side portion SP-2 may extend in the first direction DR1.

The long side portion LP-2 may include a first long side portion LP1-2, a second long side portion LP2-2, and a third long side portion LP3-2. The first long side portion LP1-2 may extend from a first non-folding area NFA1 to a second non-folding area NFA2 in the second direction DR2. The second long side portion LP2-2 may be spaced apart from the first long side portion LP1-2 in the first direction DR1 and may extend in the second direction DR2. The third long side portion LP3-2 may be spaced apart from the second long side portion LP2-2 in the second direction DR2 and may extend in the second direction DR2.

In an embodiment, each of the second long side portion LP2-2 and the third long side portion LP3-2 may face the first long side portion LP1-2. In an embodiment, the second long side portion LP2-2 may overlap the first non-folding area NFA1, a folding area FA, and the second non-folding area NFA2. The third long side portion LP3-2 may overlap the second non-folding area NFA2 and may not overlap the folding area FA.

In the illustrated embodiment, each of the first long side portion LP1-2 and the second long side portion LP2-2 may include a flexible portion EL-2 overlapping the folding area FA and first and second rigid portions MT1-2 and MT2-2 spaced apart from each other in the second direction DR2 with the flexible portion EL-2 interposed therebetween. The first rigid portion MT1-2 may overlap the first non-folding area NFA1, and the second rigid portion MT2-2 may overlap the second non-folding area NFA2.

According to the invention, in an area overlapping the folding area FA, a distance D3-1 between the long side portions LP-2 of adjacent coils of the second group GC2 may be equal to or greater than about 100 micrometers and equal to or smaller than about 1 centimeter.

That is, the distance D3-1 may indicate a distance between the long side portion LP-2 of the first coil C1-2 and the long side portion LP-2 of the second coil C2-2 or a distance between the long side portion LP-2 of the second coil C2-2 and the long side portion LP-2 of the third coil C3-2 among the first, second, and third coils C1-2, C2-2, and C3-2.

The distance between the long side portion LP (refer to FIG. 3) of the first coil and the long side portion LP (refer to FIG. 3) of the second coil, which are closest to each other, may correspond to the distance D3-1.

In an embodiment, in an area overlapping the folding area FA, a distance D3-2 between the first and second long side portions LP1-2 and LP2-2 of each of the first, second, and third coils C1-2, C2-2, and C3-2 may be equal to or greater than about 100 micrometers and equal to or smaller than about 1 centimeter.

That is, at least one of a distance between the first and second long side portions LP1-2 and LP2-2 of the first coil C1-2, a distance between the first and second long side portions LP1-2 and LP2-2 of the second coil C2-2, and a distance between the first and second long side portions LP1-2 and LP2-2 of the third coil C3-2 may correspond to the distance D3-2.

The short side portion SP-2 may include a first short side portion SP1-2 and a second short side portion SP2-2. The first short side portion SP1-2 may connect one end of the first long side portion LP1-2 and one end of the second long side portion LP2-2. The second short side portion SP2-2 may connect an opposite end of the first long side portion LP1-2 and one end of the third long side portion LP3-2.

In the illustrated embodiment, the first short side portion SP1-2 may overlap the first non-folding area NFA1, and the second short side portion SP2-2 may overlap the second non-folding area NFA2.

A line portion LNP-2 may include a first line portion LN1-2 and a second line portion LN2-2. The first line portion LN1-2 may be connected to an opposite end of the second long side portion LP2-2, and the second line portion LN2-2 may be connected to an opposite end of the third long side portion LP3-2.

In an embodiment, each of the first and second line portions LN1-2 and LN2-2 may include a first extension portion EX1-2 and a second extension portion EX2-2. The first extension portion EX1-2 may extend from the long side portion LP-2 in the first direction DR1, and the second extension portion EX2-2 may extend from the first extension portion EX1-2 in the second direction DR2 and may be connected to the connector CT.

In an embodiment, the first and second extension portions EX1-2 and EX2-2 may be disposed on different layers from each other. In an embodiment, the first extension portion EX1-2 may be disposed on the rear surface CV1-L of the first cover layer CV1 described with reference to FIG. 4A, and the second extension portion EX2-2 may be disposed on the rear surface CV2-L of the second cover layer CV2 described with reference to FIG. 4A. In this case, the first and second extension portions EX2-1 and EX2-2 may be connected to each other via a contact hole CNT-C defined through the first cover layer CV1 (refer to FIG. 4A) and the second adhesive layer AP2 (refer to FIG. 4A). In FIG. 8, the contact hole CNT-C is illustrated as a dot.

In an embodiment, a line width of each of the first and second extension portions EX1-2 (along the second direction DR2) and EX2-2 (along the first direction DR1) may be smaller than that of the first, second, and third long side portions LP1-2, LP2-2, and LP3-2 (along the first direction DR1).

The embodiments are described separately from each other with reference to FIGS. 6A to 8, however, the embodiments may be applied to one digitizer DZ. However, the invention should not be limited thereto or thereby, only an embodiment may be applied to the digitizer, or a combination of some embodiments may be applied to the digitizer depending on the display device DD (refer to FIG. 1A).

Figure 9:
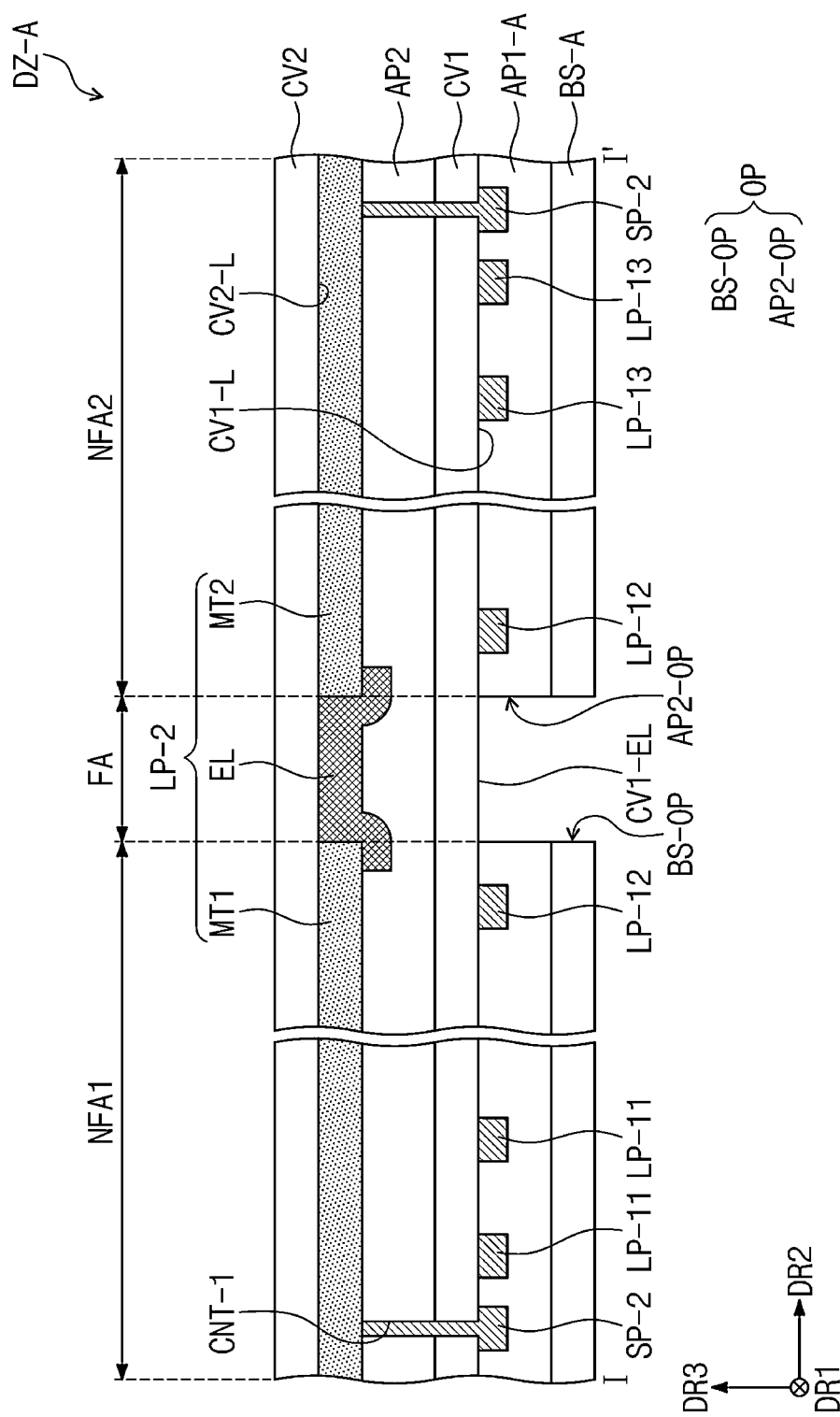
FIG. 9 is a cross-sectional view of an embodiment of a digitizer taken along line I-I' of FIG. 3 according to the invention.
Figure 10A:
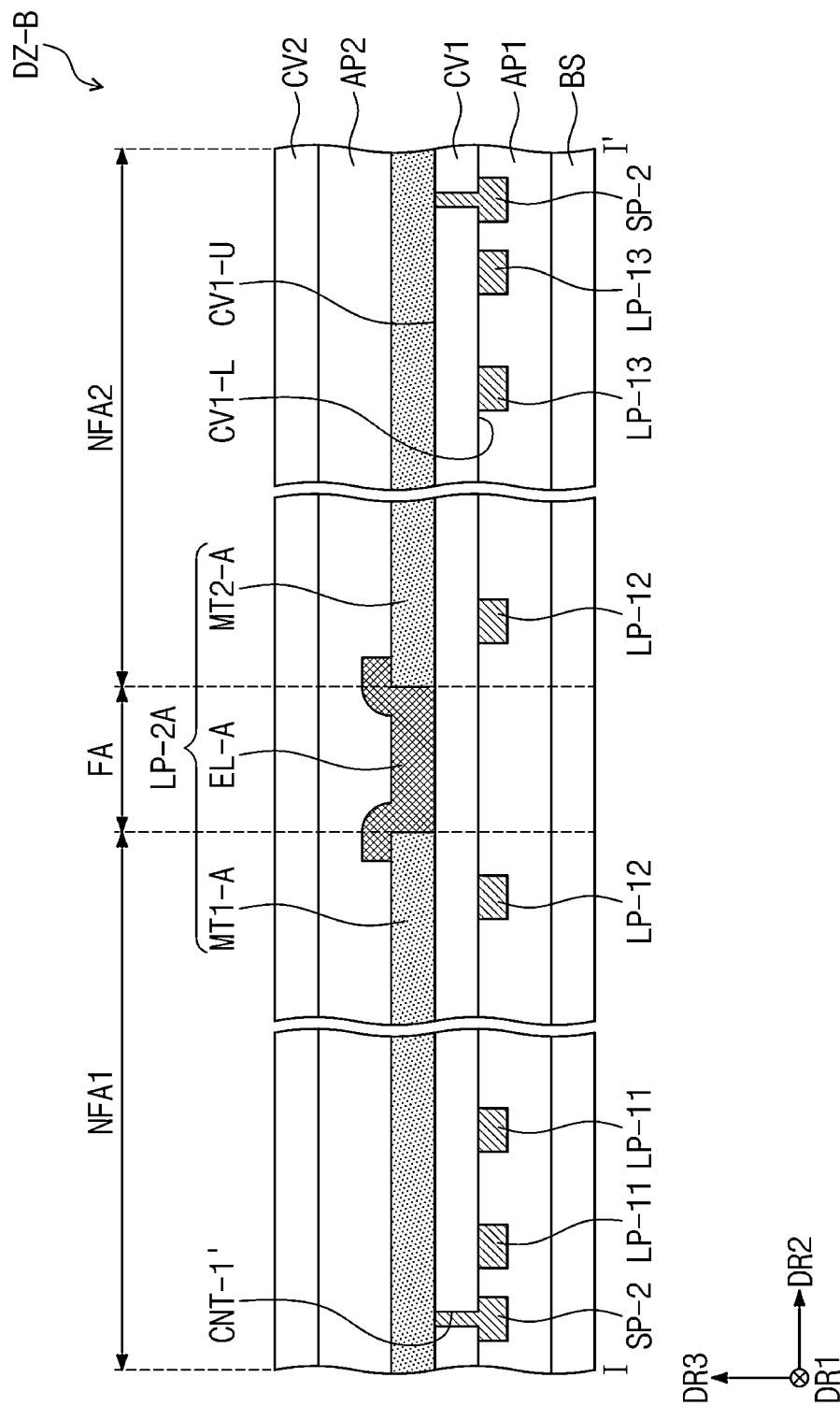
FIG. 10A is a cross-sectional view of an embodiment of a digitizer taken along line I-I' of FIG. 3 according to the invention.
Figure 10B:
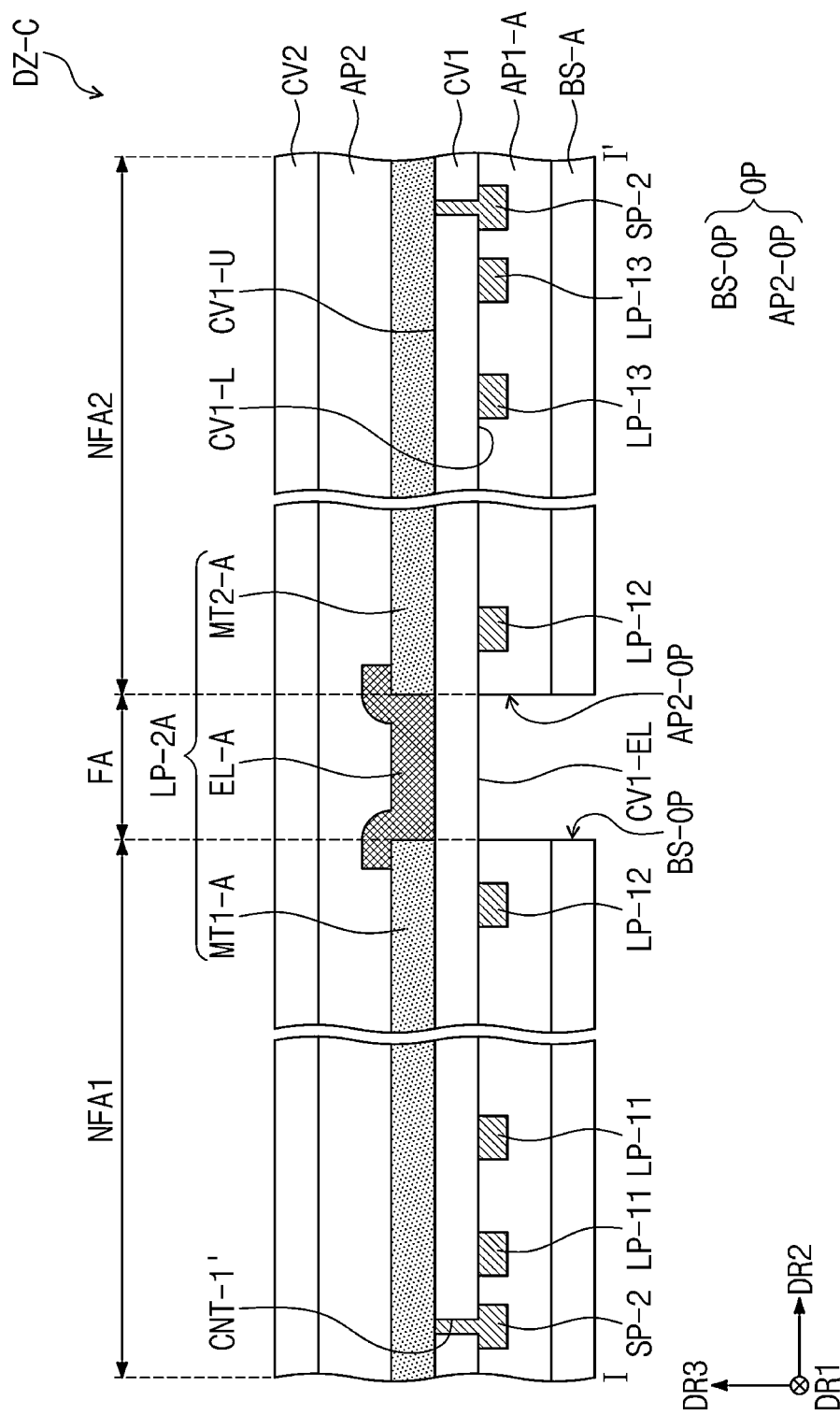
FIG. 10B is a cross-sectional view of an embodiment of a digitizer taken along line I-I' of FIG. 3 according to the invention.

FIG. 9 is a cross-sectional view of an embodiment of a digitizer DZ-A taken along line I-I' of FIG. 3 according to the invention. FIG. 10A is a cross-sectional view of an embodiment of a digitizer DZ-B taken along line I-I' of FIG. 3 according to the invention. FIG. 10B is a cross-sectional view of an embodiment of a digitizer DZ-C taken along line I-I' of FIG. 3 according to the invention.

Differently from the digitizer DZ described with reference to FIG. 4A, the digitizer DZ-A shown in FIG. 9 may be further provided with a folding opening OP defined under a first cover layer CV1.

Referring to FIG. 9, the digitizer DZ-A may include a base layer BS-A through which a first opening BS-OP is defined to overlap a folding area FA and a first adhesive layer AP1-A through which a second opening AP2-OP is defined to overlap the folding area FA.

The folding opening OP may be defined by the first opening BS-OP of the base layer BS-A and the second opening AP2-OP of the first adhesive layer AP1-A. In this case, a portion of a rear surface CV1-EL of the first cover layer CV1 may be exposed without being covered by the base layer BS-A and the first adhesive layer AP1-A.

In the illustrated embodiment, since the folding opening OP is defined, a thickness of the digitizer DZ-A may be reduced in the folding area FA, and a rigidity of the digitizer DZ-A may decrease in the folding area FA. Therefore, the digitizer DZ-A may be easily folded, and cracks may be prevented from occurring in lines of the digitizer DZ-A when the digitizer DZ-A is folded.

Differently from the digitizer DZ described with reference to FIG. 4A, the digitizer DZ-B shown in FIG. 10A may include a coil portion CNP (refer to FIG. 3) extending in the second direction DR2 or a line portion LNP (refer to FIG. 3) extending in the second direction DR2, which is disposed on an upper surface CV1-U of a first cover layer CV1.

Referring to FIG. 10A, in the digitizer DZ-B, long side portions LP-11, LP-12, and LP-13 of a first group GC1 (refer to FIG. 3), which extend in the first direction DR1, may be disposed on a rear surface CV1-L of the first cover layer CV1, and a long side portion LP-2A of a second group GC2 (refer to FIG. 3), which extends in the second direction DR2, may be disposed on the upper surface CV1-U of the first cover layer CV1. That is, in the illustrated embodiment, each of a flexible portion EL-A and rigid portions MT1-A and MT2-A, which are included in the long side portion LP-2A of the second group GC2 may be disposed on the upper surface CV1-U of the first cover layer CV1.

In an embodiment, a short side portion SP-2 of the second group GC2, which extends in the first direction DR1, may be disposed on the rear surface CV1-L of the first cover layer CV1. In this case, the short side portion SP-2 of the second group GC2 may be connected to the long side portion LP-2A of the second group GC2 via a contact hole CNT-1' defined through the first cover layer CV1.

Although not shown in FIG. 10A, a line portion LNP (refer to FIG. 3) of each of first sub-coils GC1-1 (refer to FIG. 3) extending in the second direction DR2 and a short side portion SP (refer to FIG. 3) of each of second sub-coils GC1-2 (refer to FIG. 3) may be disposed on the upper surface CV1-U of the first cover layer CV1 as the long side portion LP-2A of the second group GC2.

As the coils are disposed on one of the upper surface CV1-U and the rear surface CV1-L of the first cover layer CV1, the digitizer DZ-B may be manufactured through a more simplified process compared with the digitizers DZ and DZ-A shown in FIGS. 4A and 9.

In the digitizers DZ and DZ-A shown in FIGS. 4A and 9, since the flexible portion EL where the step difference is defined is disposed on the rear surface CV2-L of the second cover layer CV2, the step difference of the flexible portion EL-12 may be formed or provided in a lower direction away from the display panel DP (refer to FIG. 2). Accordingly, the influence of the step difference of the flexible portion EL on the display panel DP may be small compared to the digitizer DZ shown in FIG. 10A, and a surface quality of the display device DD (refer to FIG. 1A) may be improved.

Differently from the digitizer DZ-B described with reference to FIG. 10A, the digitizer DZ-C shown in FIG. 10B may include a base layer BS-A and a first adhesive layer AP1-A through which a folding opening OP is defined.

The folding opening OP may be defined by a first opening BS-OP defined through the base layer BS-A overlapping a folding area FA and a second opening AP2-OP defined through the first adhesive layer AP1-A overlapping the folding area FA. A portion of a rear surface CV1-EL of a first cover layer CV1 may be exposed without being covered by the base layer BS-A and the first adhesive layer AP1-A.

Although the embodiments of the invention have been described, it is understood that the invention should not be limited to these embodiments but various changes and modifications may be made by one ordinary skilled in the art within the spirit and scope of the invention as hereinafter claimed.

Therefore, the disclosed subject matter should not be limited to any single embodiment described herein, and the scope of the invention shall be determined according to the attached claims.

What is claimed is:

1. A digitizer comprising:
a base layer comprising:
a first area; and
a second area adjacent to the first area and flexible; and
a plurality of coils disposed on the base layer and comprising:
a first coil and a second coil closest to the first coil, each of the first coil and the second coil comprising:
a coil portion defining an open loop; and
a line portion extending from the coil portion,
wherein the coil portion or the line portion overlaps the second area, and
a distance in a first direction between the coil portion of the first coil and the coil portion of the second coil or a distance in the first direction between the line portion of the first coil and the line portion of the second coil, which overlap the second area and extend in a second direction crossing the first direction, is equal to or greater than about 100 micrometers.

2. The digitizer of claim 1, wherein the coil portion extends in the first direction, the line portion extends in the second direction, and the line portion overlaps the second area.

3. The digitizer of claim 2, wherein the line portion comprises:
a flexible portion overlapping the second area; and
a first rigid portion disposed between the flexible portion and the coil portion.

4. The digitizer of claim 3, wherein the line portion further comprises a second rigid portion spaced apart from the first rigid portion with the flexible portion interposed therebetween.

5. The digitizer of claim 4, wherein the second rigid portion comprises:
a first extension portion connected to the flexible portion and extending in the second direction;
a second extension portion spaced apart from the first extension portion and extending in the second direction; and
a bridge extending in the first direction, connecting the first extension portion to the second extension portion, and disposed in a layer different from a layer in which the first extension portion is disposed.

6. The digitizer of claim 5, wherein the coil portion comprises at least one long side portion extending in the first direction, and the bridge has a line width equal to or smaller than a half of a line width of the at least one long side portion.

7. The digitizer of claim 3, wherein the coil portion comprises:
a first long side portion extending in the first direction;
a second long side portion spaced apart from the first long side portion in the second direction;
a third long side portion spaced apart from the first long side portion in the second direction and spaced apart from the second long side portion in the first direction;
a first short side portion connecting one end of the first long side portion to one end of the second long side portion; and
a second short side portion connecting an opposite end of the first long side portion opposite to the one end of the first long side portion to one end of the third long side portion.

8. The digitizer of claim 7, wherein the first long side portion is disposed in a layer different from the first rigid portion and the first short side portion.

9. The digitizer of claim 7, wherein the line portion comprises a first line portion and a second line portion, the first line portion is connected to an opposite end of the second long side portion opposite to the one end of the second long side portion, and the second line portion is connected to an opposite end of the third long side portion opposite to the one end of the third long side portion.

10. The digitizer of claim 9, wherein a distance between the first line portion and the second line portion is equal to or greater than about 100 micrometers.

11. The digitizer of claim 3, wherein the flexible portion comprises a flexible conductor.

12. The digitizer of claim 11, wherein the flexible conductor comprises:
   a conductive filler including at least one of copper, silver, and graphite; and
   a flexible polymer including at least one of a styrene-butadiene rubber, a butadiene rubber, a butyl rubber, a silicone rubber, and a urethane rubber.

13. The digitizer of claim 3, wherein the flexible portion has a fracture strain of about 2% or more, and a resistivity of the flexible portion is equal to or greater than about $1.72 \times 10^{-8}$ ohm-meter and equal to or smaller than about $1.00 \times 10^{-4}$ ohm-meter.

14. The digitizer of claim 3, wherein the first rigid portion has a resistivity smaller than a resistivity of the flexible portion, and the flexible portion has a fracture strain greater than a fracture strain of the first rigid portion.

15. The digitizer of claim 3, wherein the first rigid portion includes a copper.

16. The digitizer of claim 2, wherein the plurality of coils further comprises a third coil comprising a coil portion insulated from the coil portion of each of the first and second coils while crossing the coil portion of each of the first and second coils.

17. The digitizer of claim 1, wherein the coil portion extends in the first direction, the line portion extends in the second direction, and the coil portion overlaps the second area.

18. The digitizer of claim 17, wherein the coil portion comprises:
   a first long side portion extending in the first direction;
   a second long side portion spaced apart from the first long side portion in the second direction;
   a third long side portion spaced apart from the first long side portion in the second direction and spaced apart from the second long side portion in the first direction;
   a first short side portion connecting one end of the first long side portion to one end of the second long side portion; and
   a second short side portion connecting an opposite end of the first long side portion opposite to one end of the first long side portion to one end of the third long side portion, and the first short side portion comprises:
   a flexible portion overlapping the second area; and
   a rigid portion connected to the flexible portion.

19. The digitizer of claim 18, wherein the flexible portion or the rigid portion is connected to the one end of the second long side portion.

20. The digitizer of claim 18, wherein the rigid portion comprises:
   a first extension portion connected to the flexible portion and extending in the second direction;
   a second extension portion spaced apart from the first extension portion and extending in the second direction; and
   a bridge extending in the first direction, connecting the first extension portion to the second extension portion, and disposed in a layer different from a layer in which the first extension portion is disposed.

21. The digitizer of claim 1, wherein the coil portion extends in the second direction, and the coil portion overlaps the second area.

22. The digitizer of claim 21, wherein the coil portion comprises a long side portion extending in the second direction, and the long side portion comprises:
   a flexible portion overlapping the second area; and
   a rigid portion disposed between the flexible portion and the line portion.

23. The digitizer of claim 22, wherein the coil portion comprises a first long side portion and a second long side portion spaced apart from the first long side portion in the first direction, and a distance between the first long side portion and the second long side portion is equal to or greater than about 100 micrometers.

24. The digitizer of claim 21, wherein the line portion comprises:
   a first extension portion extending in the first direction and disposed in a layer different from a layer in which the coil portion is disposed; and
   a second extension portion extending in the second direction and disposed in a layer different from a layer in which the first extension portion is disposed.

25. The digitizer of claim 1, further comprising a plurality of insulating layers disposed on the base layer, wherein at least one of the plurality of insulating layers is provided with an opening defined therethrough in the second area.

26. An electronic device comprising:
   a base layer comprising:
      a first area; and
      a second area adjacent to the first area and flexible; and
   a plurality of coils disposed on the base layer and comprising:
      a first coil and a second coil closest to the first coil, each of the first coil and the second coil comprising:
         a coil portion defining an open loop; and
         a line portion extending from the coil portion,
      wherein the coil portion or the line portion overlaps the second area, and
   a distance in a first direction between the coil portion of the first coil and the coil portion of the second coil or a distance in the first direction between the line portion of the first coil and the line portion of the second coil, which overlap the second area and extend in a second direction crossing the first direction, is equal to or greater than about 100 micrometers.

* * * * *